United States Patent
Hu et al.

(10) Patent No.: US 10,178,931 B2
(45) Date of Patent: Jan. 15, 2019

(54) UPRIGHT VACUUM CLEANER

(71) Applicant: JIANGSU MIDEA CLEANING APPLIANCES CO., LTD., Suzhou (CN)

(72) Inventors: Wei Hu, Suzhou (CN); Hui Zou, Suzhou (CN); Xiahu Xiao, Suzhou (CN)

(73) Assignee: JIANGSU MIDEA CLEANING APPLIANCES CO., LTD., Suzhou (CN)

( * ) Notice: Subject to any disclaimer, the term of this patent is extended or adjusted under 35 U.S.C. 154(b) by 0 days.

(21) Appl. No.: 15/539,158

(22) PCT Filed: Mar. 4, 2016

(86) PCT No.: PCT/CN2016/075605
§ 371 (c)(1),
(2) Date: Jun. 23, 2017

(87) PCT Pub. No.: WO2017/096718
PCT Pub. Date: Jun. 15, 2017

(65) Prior Publication Data
US 2018/0263440 A1    Sep. 20, 2018

(30) Foreign Application Priority Data

Dec. 10, 2015  (CN) .......................... 2015 1 0917466
Dec. 10, 2015  (CN) .......................... 2015 1 0917497
(Continued)

(51) Int. Cl.
*A47L 5/30*    (2006.01)
*A47L 9/04*    (2006.01)
(Continued)

(52) U.S. Cl.
CPC ............... *A47L 9/0411* (2013.01); *A47L 5/22* (2013.01); *A47L 5/28* (2013.01); *A47L 5/30* (2013.01);
(Continued)

(58) Field of Classification Search
CPC ..... A47L 5/22; A47L 5/28; A47L 5/30; A47L 9/00; A47L 9/04; A47L 9/0411;
(Continued)

(56) References Cited

U.S. PATENT DOCUMENTS 2,037,648 A * 4/1936 Bergstrom ............ A47L 9/0411
15/179
2,221,745 A * 11/1940 Kirby ......................... A47L 5/10
15/324
(Continued)

FOREIGN PATENT DOCUMENTS

CN    1667197 A    9/2005
CN    2845692 Y    12/2006
(Continued)

OTHER PUBLICATIONS

EP office action dated Feb. 8, 2018 in the corresponding EP application(application No. 16871930.0).
(Continued)

*Primary Examiner* — Marc Carlson
(74) *Attorney, Agent, or Firm* — Kilpatrick Townsend & Stockton LLP

(57) ABSTRACT

A vertical vacuum cleaner (1) is provided, including a brushroll (22); a motor assembly (200) including a motor housing (21) and a motor (22), in which the motor (22) is configured to drive the brushroll (22) to roll via a drive belt (13) and is rotatable between a first upright position where the drive belt (13) is tensioned and a first oblique position where the drive belt (13) is loosened; a body assembly (300)
(Continued)

including a body (31) and a bridging member (32) rotatably connected with the motor housing (21); a lever driving device rotatably disposed to the motor housing (21) and having two ends respectively fitted with the bridging member (32) and the motor (22), in which the bridging member (32) is configured to drive the motor (22) to move from the first oblique position to the first upright position via the lever driving device.

20 Claims, 9 Drawing Sheets

(30) Foreign Application Priority Data

| Dec. 10, 2015 | (CN) | 2015 1 0917498 |
|---|---|---|
| Dec. 10, 2015 | (CN) | 2015 1 0917499 |
| Dec. 10, 2015 | (CN) | 2015 1 0917528 |
| Dec. 10, 2015 | (CN) | 2015 1 0917653 |
| Dec. 10, 2015 | (CN) | 2015 1 0918541 |
| Dec. 10, 2015 | (CN) | 2015 1 0918544 |
| Dec. 10, 2015 | (CN) | 2015 1 0918580 |
| Dec. 10, 2015 | (CN) | 2015 1 0918662 |
| Dec. 10, 2015 | (CN) | 2015 2 1027156 U |
| Dec. 10, 2015 | (CN) | 2015 2 1027158 U |
| Dec. 10, 2015 | (CN) | 2015 2 1027550 U |
| Dec. 10, 2015 | (CN) | 2015 2 1028726 U |
| Dec. 10, 2015 | (CN) | 2015 2 1028730 U |
| Dec. 10, 2015 | (CN) | 2015 2 1028739 U |
| Dec. 10, 2015 | (CN) | 2015 2 1028779 U |
| Dec. 10, 2015 | (CN) | 2015 2 1028784 U |
| Dec. 10, 2015 | (CN) | 2015 2 1028812 U |
| Dec. 10, 2015 | (CN) | 2015 2 1028814 U |
| Dec. 10, 2015 | (CN) | 2015 2 1028913 U |
| Dec. 10, 2015 | (CN) | 2015 2 1029002 U |
| Dec. 10, 2015 | (CN) | 2015 2 1029087 U |
| Dec. 10, 2015 | (CN) | 2015 2 1029798 U |
| Dec. 10, 2015 | (CN) | 2015 2 1030034 U |
| Mar. 1, 2016 | (CN) | 2016 1 0114861 |
| Mar. 1, 2016 | (CN) | 2016 2 0155481 U |

(51) Int. Cl.
| A47L 9/10 | (2006.01) |
|---|---|
| A47L 9/14 | (2006.01) |
| A47L 9/16 | (2006.01) |
| A47L 9/28 | (2006.01) |
| F16H 7/08 | (2006.01) |
| A47L 5/22 | (2006.01) |
| A47L 9/00 | (2006.01) |
| A47L 5/28 | (2006.01) |
| A47L 9/24 | (2006.01) |
| F16D 23/12 | (2006.01) |

(52) U.S. Cl.
CPC .............. *A47L 9/00* (2013.01); *A47L 9/04* (2013.01); *A47L 9/0444* (2013.01); *A47L 9/0477* (2013.01); *A47L 9/102* (2013.01); *A47L 9/1409* (2013.01); *A47L 9/16* (2013.01); *A47L 9/1683* (2013.01); *A47L 9/248* (2013.01); *A47L 9/28* (2013.01); *A47L 9/2852* (2013.01); *A47L 9/2857* (2013.01); *F16H 7/0827* (2013.01); *F16D 2023/126* (2013.01)

(58) Field of Classification Search
CPC ...... A47L 9/0444; A47L 9/0477; A47L 9/102; A47L 9/1409; A47L 9/16; A47L 9/1683; A47L 9/248; A47L 9/28; A47L 9/2852; A47L 9/2857; F16D 2023/126; F16H 7/0827
See application file for complete search history.

(56) References Cited

U.S. PATENT DOCUMENTS

| 2,343,732 | A | * | 3/1944 | Baird | A47L 5/30 |
| | | | | | 15/319 |
| 2,627,623 | A | * | 2/1953 | Humphrey | A47L 5/32 |
| | | | | | 15/372 |
| 2,637,874 | A | * | 5/1953 | White | A47L 5/32 |
| | | | | | 15/332 |
| 2,691,791 | A | | 10/1954 | Humphrey | |
| 4,249,281 | A | * | 2/1981 | Meyer | A47L 5/30 |
| | | | | | 15/340.2 |
| 4,419,784 | A | * | 12/1983 | Lex | A47L 5/26 |
| | | | | | 15/344 |
| 5,537,712 | A | * | 7/1996 | Weber | A47L 5/26 |
| | | | | | 15/332 |
| 5,901,411 | A | * | 5/1999 | Hato | A47L 9/0411 |
| | | | | | 15/377 |
| 6,067,689 | A | * | 5/2000 | Roney | A47L 5/30 |
| | | | | | 15/332 |
| 6,098,243 | A | * | 8/2000 | Kim | A47L 5/30 |
| | | | | | 15/332 |
| 2004/0074044 | A1 | * | 4/2004 | Diehl | A47L 5/22 |
| | | | | | 15/412 |
| 2005/0217069 | A1 | | 10/2005 | Joung et al. | |
| 2006/0277713 | A1 | * | 12/2006 | Sandlin | A47L 9/04 |
| | | | | | 15/387 |
| 2006/0288521 | A1 | * | 12/2006 | Ogawa | A47L 5/30 |
| | | | | | 15/390 |
| 2008/0078041 | A1 | * | 4/2008 | Mitchel | A47L 11/305 |
| | | | | | 15/50.3 |
| 2010/0257693 | A1 | | 10/2010 | Sweeby et al. | |
| 2011/0179596 | A1 | * | 7/2011 | Krebs | A47L 5/30 |
| | | | | | 15/389 |
| 2012/0005857 | A1 | * | 1/2012 | Tran | A47L 9/045 |
| | | | | | 15/390 |
| 2017/0296015 | A1 | * | 10/2017 | Hu | A47L 5/30 |

FOREIGN PATENT DOCUMENTS

| CN | 101201123 A | 6/2008 |
|---|---|---|
| CN | 101874723 A | 11/2010 |
| CN | 202235160 U | 5/2012 |
| CN | 102871604 A | 1/2013 |
| CN | 204520516 U | 8/2015 |
| CN | 205251420 U | 5/2016 |
| CN | 205338839 U | 6/2016 |
| EP | 0520175 A1 | 12/1992 |
| GB | 2486666 A | 6/2012 |
| JP | 2000157459 A | 6/2000 |

OTHER PUBLICATIONS

CN Office action dated May 26, 2017 in the corresponding CN application(application No. 201510917499.7).
CN Office action dated Jun. 1, 2017 in the corresponding CN application(application No. 201510917528.X).
CN Office action dated Jun. 1, 2017 in the corresponding CN application(application No. 201510918580.7).

* cited by examiner

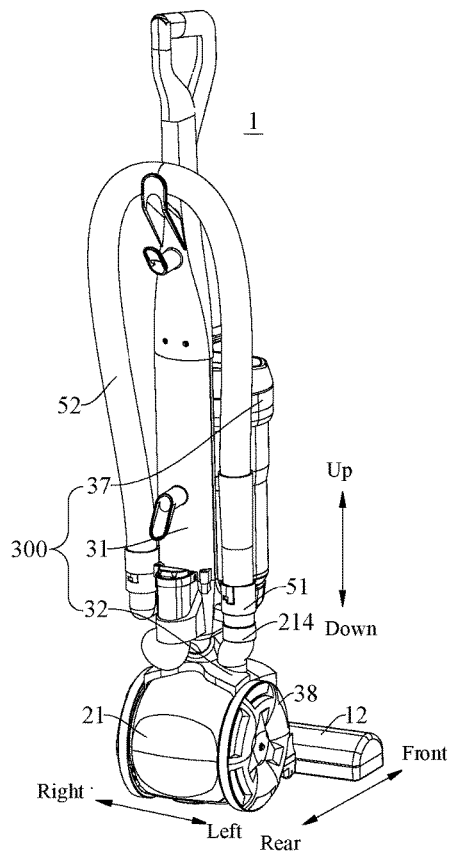
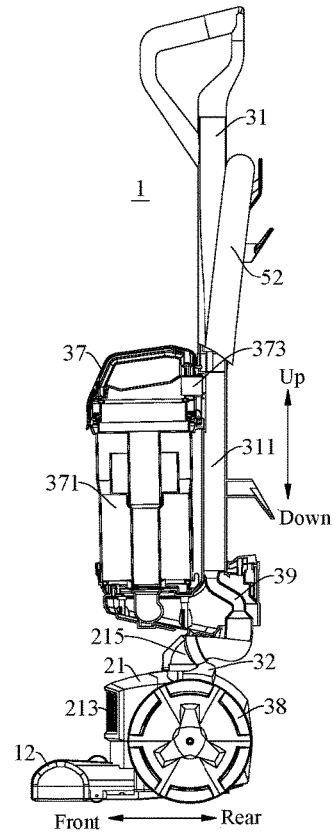
Fig. 5　　　　　　　　Fig. 6
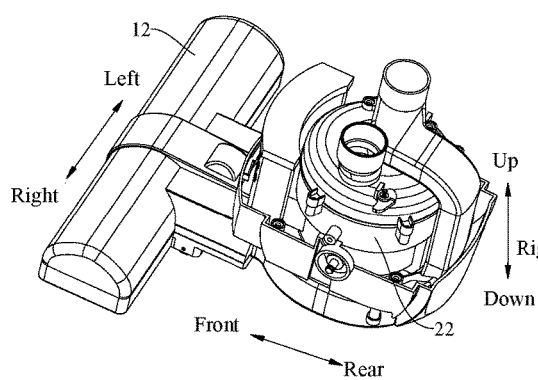
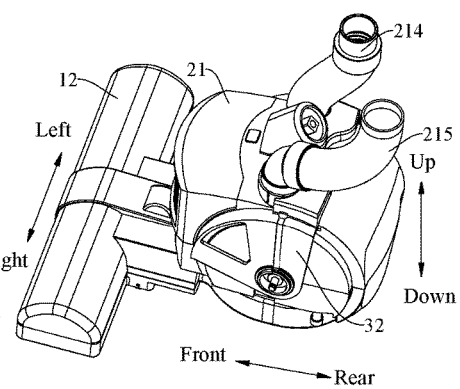
Fig. 7　　　　　　　　Fig. 8

UPRIGHT VACUUM CLEANER

CROSS REFERENCE TO RELATED APPLICATION

The present application is a National Stage of International Application No. PCT/CN2016/075605, filed Mar. 4, 2016, which claims the priority and benefit of Chinese Patent Application No. 201510917499.7, 201521029002.X, 201510917466.2, 201521028726.2, 201510917497.8, 201521028730.9, 201521029087.1, 201510918662.1, 201521028812.3, 201510918544.0, 201521028739.X, 201510918580.7, 201521027156.5, 201510917498.2, 201521027158.4, 201521028814.2, 201521028779.4, 201521029798.9, 201510918541.7, 201521027550.9, 201510917653.0, 201521028784.5, 201510917528.X, 201521028913.0, and 201521030034.1, all filed on Dec. 10, 2015, and 201610114861.1 and 201620155481.8, both filed on Mar. 1, 2016, the contents of which are incorporated herein by reference in their entirety.

FIELD

The present disclosure relates to a field of cleaning machines, and particularly to an upright vacuum cleaner.

BACKGROUND

A vacuum cleaner in the related art includes two motors to drive a brushroll and a fan respectively, and the motor for driving the fan is usually arranged horizontally. That is, a motor shaft of the motor is parallel to a mounting platform for the motor, such that a motor housing for the motor has a huge volume and the motor occupies a large area. Moreover, the motor arranged horizontally will limit arrangements of other parts in the vacuum cleaner to a great extent.

SUMMARY

The present disclosure aims to solve at least one of the problems existing in the related art. Thus, embodiments of the present disclosure provide an upright vacuum cleaner with a simple and compact structure, which is convenient to operate, occupies a small space, and runs in a stable and reliable manner.

According to embodiments of the present disclosure, the upright vacuum cleaner includes: a brushroll; a motor assembly including a motor housing and a motor disposed in the motor housing, in which the motor is configured to drive the brushroll to roll by a drive belt and is rotatable between a first upright position in which the drive belt is tensioned and a first oblique position in which the drive belt is loosened; a body assembly including a body and a bridging member mounted to the body, in which the bridging member is rotatably connected with the motor housing to allow the body to be rotatable between a second upright position and a second oblique position; and a lever driving device rotatably disposed to the motor housing and having two ends respectively fitted with the bridging member and the motor, in which the bridging member is configured to drive the motor to move from the first oblique position to the first upright position via the lever driving device when the body is moved from the second upright position to the second oblique position.

In the upright vacuum cleaner according to embodiments of the present disclosure, with the lever driving device being provided to the motor housing and the two ends of the lever driving device being fitted with the bridging member and the motor respectively, it is possible to realize the rotation of the motor and adjust the tension degree of the drive belt, so as to guarantee the normal operation of dust sweep and dust suction, the upright vacuum cleaner is easy to assemble and disassemble, and may operate stably and reliably with a high working efficiency. Additionally, the motor of the upright vacuum cleaner is arranged vertically to reduce an occupation space of the upright vacuum cleaner and facilitate diverse arrangements of various parts of the upright vacuum cleaner. Moreover, the upright vacuum cleaner is convenient to manipulate and occupies a small space.

According to an example of the present disclosure, the bridging member is provided with a sliding rail, the sliding rail defines a sliding-rail tail groove at a tail end thereof, and the sliding-rail tail groove is formed by recessing a surface of the tail end of the sliding rail. The lever driving device is configured as a lever rotating member rotatably disposed to the motor housing and defining two ends fitted with the sliding rail and the motor respectively. When the body is moved from the second upright position to the second oblique position, the body slides a first end of the lever rotating member out from the sliding-rail tail groove to the sliding rail via the bridging member, so as to rotate the lever rotating member, so that a second end of the lever rotating member drives the motor to move from the first oblique position to the first upright position.

According to an example of the present disclosure, the sliding rail is configured as an arc sliding rail whose central axis is a rotating axis of the bridging member.

According to an example of the present disclosure, the sliding-rail tail groove is smoothly transmitted to and connected with the sliding rail via a guide surface.

According to an example of the present disclosure, the sliding rail is provided to an inner top wall of the bridging member.

According to an example of the present disclosure, one lever rotating member is provided and opposite to a center of a top of a side of the motor away from the brushroll.

According to an example of the present disclosure, the lever rotating member includes a rotational mounting part rotatably connected to the motor housing; a first actuating part and a second actuating part, in which the first actuating part and the second actuating part are respectively fixed to both sides of the rotational mounting part in a same axial section thereof and extend away from each other. The first actuating part is fitted with the motor, while the second actuating part is fitted with the sliding rail.

According to an example of the present disclosure, a surface of the second actuating part fitted with the sliding rail is configured as a first smooth curved surface.

According to an example of the present disclosure, a surface of the first actuating part fitted with the motor is configured as a second smooth curved surface.

According to an example of the present disclosure, the lever driving device is configured as a lever cam member, and the lever cam member is rotatably connected to a top wall and/or a side wall of the motor housing.

According to an example of the present disclosure, the lever driving device is configured as a lever cam member, and two lever cam members are symmetrically provided to two side walls of the motor housing.

According to an example of the present disclosure, the lever cam member includes: a rotational connecting portion rotatably connected to the motor housing; a first actuating portion and a second actuating portion respectively fixed to two sides of the rotational connecting portion in a same axial section thereof and extending away from each other, in which the first actuating portion is configured to be fitted with the motor, and the second actuating portion is configured to be fitted with the bridging member.

According to an example of the present disclosure, a maximum distance between the second actuating portion and a center of the rotational connecting portion is greater than a maximum distance between the first actuating portion and the center of the rotational connecting portion.

According to an example of the present disclosure, a width of the first actuating portion is decreased gradually along a direction running away from the rotational connecting portion, and a width of the second actuating portion is decreased gradually along another direction running away from the rotational connecting portion.

According to an example of the present disclosure, one of the motor housing and the rotational connecting portion is provided with a rotating shaft, and the other one of the motor housing and the rotational connecting portion has a hole in which the rotating shaft is fitted.

According to an example of the present disclosure, the motor is provided with a first contact block configured to be fitted with the first actuating part.

According to an example of the present disclosure, the lever cam member has a retaining groove, and the first contact block is configured to be fitted in the retaining groove when the motor is located at the first oblique position.

According to an example of the present disclosure, the bridging member is provided with a second contact block configured to be fitted with the second actuating part.

According to an example of the present disclosure, an elastic member is provided between the motor and the motor housing and is configured to push the motor to move from the first upright position to the first oblique position when the body is moved from the second oblique position to the second upright position.

According to an example of the present disclosure, the motor is provided with a first column and the motor housing is provided with a second column, the elastic member is configured as a spring and has two ends fitted over the first column and the second column respectively, so as to constantly apply a push force on the motor towards the first oblique position.

According to an example of the present disclosure, the motor is rotated from the first oblique position to the first upright position by an angle of 1° to 10°.

According to an example of the present disclosure, the motor is rotated from the first oblique position to the first upright position by an angle of 3° to 8°.

According to an example of the present disclosure, the motor is rotated from the first oblique position to the first upright position by an angle of 5°.

According to an example of the present disclosure, the upright vacuum cleaner further includes a tensioning wheel or another elastic member for adjusting a tension degree of the drive belt.

According to an example of the present disclosure, the bridging member and the body are processed and molded separately and connected by assembling, or the bridging member and the body are processed and molded integrally.

According to an example of the present disclosure, a motor shaft of the motor is arranged vertically, a rotating axis of the brushroll is perpendicular to the motor shaft, and the drive belt is twisted by an angle of 90° and winded upon the motor shaft and the brushroll respectively, so as to allow the motor to drive the brushroll to roll.

According to an example of the present disclosure, the brushroll includes a first brushroll section provided with bristles, a second brushroll section provided with bristles, and a connecting-shaft section connected between the first brushroll section and the second brushroll section, the drive belt is winded upon the motor shaft and the connecting-shaft section to allow the motor to drive the brushroll to roll.

According to an example of the present disclosure, respective central axes of the first brushroll section, the second brushroll section and the connecting-shaft section are located in a same line, the first brushroll section and the second brushroll section are arranged symmetrically with respect to the drive belt.

According to an example of the present disclosure, the upright vacuum cleaner further includes a brushroll casing covering the brushroll, in which the brushroll casing defines a drive-belt mounting chamber configured to accommodate the connecting-shaft section and the drive belt, a first air-suction channel and a second air-suction channel located at both sides of the drive-belt mounting chamber and separated from the drive-belt mounting chamber.

Additional aspects and advantages of the present disclosure will be given in part in the following descriptions, become apparent in part from the following descriptions, or be learned from the practice of the present disclosure.

BRIEF DESCRIPTION OF THE DRAWINGS

FIG. 5 is a schematic view of an upright vacuum cleaner according to another embodiment of the present disclosure;

FIG. 6 is a side view of the upright vacuum cleaner illustrated in FIG. 5;

FIG. 7 is an assembling view of a brushroll assembly and a motor assembly of an upright vacuum cleaner according to an embodiment of the present disclosure;

FIG. 8 is an assembling view of a brushroll assembly and a motor assembly of an upright vacuum cleaner according to another embodiment of the present disclosure;

REFERENCE NUMERALS

Figure 1:
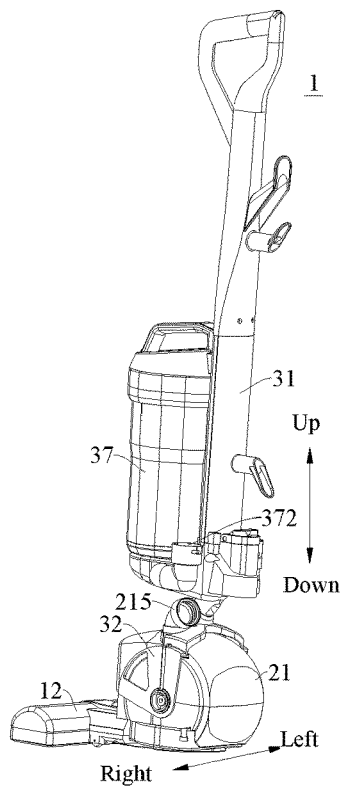
FIG. 1 is a schematic view of an upright vacuum cleaner according to an embodiment of the present disclosure.

1: upright vacuum cleaner;
100: brushroll assembly; 11: brushroll; 111: first brushroll section; 1111: first body; 1112: first bristle; 112: second brushroll section; 1121: second body; 1122: second bristle; 113: connecting-shaft section; 12: brushroll casing; 122: brushroll air-suction channel; 1221: first air-suction channel; 1222: second air-suction channel; 123: drive-belt mounting chamber; 124: upper casing; 125: lower casing; 13: drive belt; 14: tensioning wheel;
200: motor assembly; 21: motor housing; 211: dirty air outlet; 212: clean air inlet; 213: air-exhaust hole; 214: dirty air output pipe; 215: clean air input pipe; 216: motor air-suction channel; 2161: first branch channel; 2162: second branch channel; 217: second column; 22: motor; 221: motor shaft; 222: motor casing; 223: first column; 224: spring;
300: body assembly; 31: body; 311: body air-exhaust channel; 32: bridging member; 321: top plate; 3213: sliding rail; 3214: sliding-rail tail groove; 322: side plate; 37: dirt cup; 371: separating chamber; 372: air inlet; 373: air outlet; 38: wheel; 39: air-exhaust pipe;
410: level driving device; 41b (41c): lever cam member; 411b (411c): rotational connecting portion; 412b (412c): first actuating portion; 413b (413c): second actuating portion; 414b (414c): retaining groove; 42b (42c): first contact block; 43b (43c): second contact block; 44b (44c): rotating shaft; 41e: lever rotating member; 411e: rotating mounting part; 412e: first actuating part; 413e: second actuating part;
51: air inlet pipe; 52: hose.

DETAILED DESCRIPTION

Embodiments of the present disclosure will be described in detail below and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

The following description provides a plurality of different embodiments or examples to realize different structures of the present disclosure. To simplify the description of the present disclosure, components and configurations in specific examples are elaborated below. Certainly, they are only explanatory, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

An upright vacuum cleaner 1 according to embodiments of the present disclosure will be described with reference to FIGS. 1 to 35.

As shown in FIGS. 1 to 10, the vertical vacuum cleaner 1 according to embodiments of the present disclosure includes a brushroll 11, a motor assembly 200, a body assembly 300 and a lever driving device 410. Specifically, the motor assembly 200 includes a motor housing 21 and a motor 22 disposed in the motor housing 21, in which the motor 22 drives the brushroll 11 to roll via a drive belt 13 and is rotatable between a first upright position where the drive belt 13 is tensioned and a first oblique position where the drive belt 13 is loosened.

In other words, the vertical vacuum cleaner 1 mainly includes the brushroll 11, the motor assembly 200, the body assembly 300 and the lever driving device 410. The motor assembly 200 is connected with the brushroll 11, the body assembly 300 and the lever driving device 410 respectively.

Figure 2:
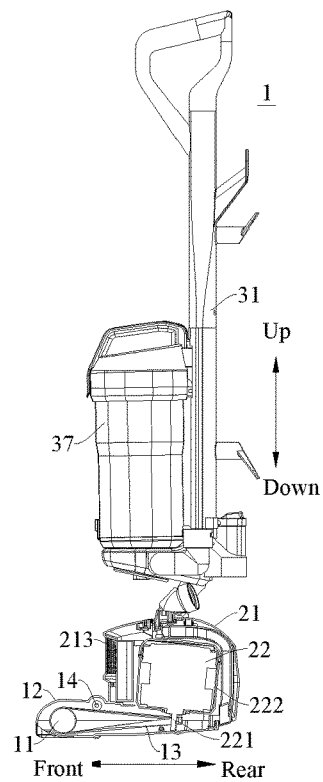
FIG. 2 is a side view of the upright vacuum cleaner illustrated in FIG. 1, in which a motor of the upright vacuum cleaner is located at a first oblique position.
Figure 3:
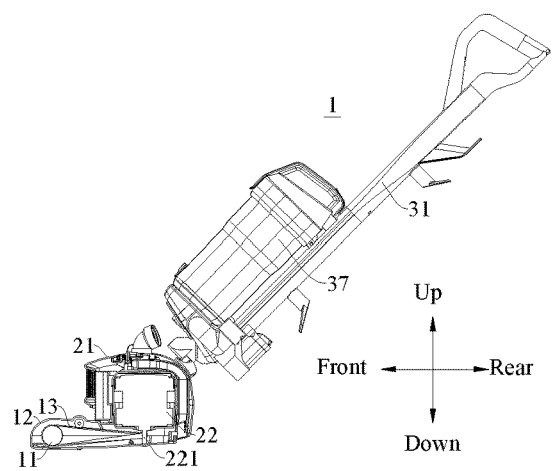
FIG. 3 is a side view of the upright vacuum cleaner illustrated in FIG. 1, in which the motor of the upright vacuum cleaner is located at a first upright position.
Figure 4:
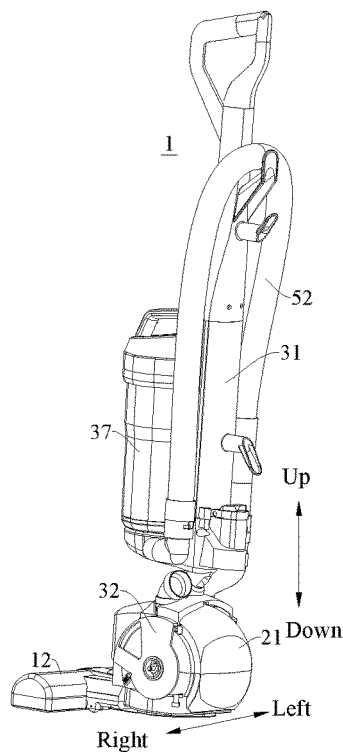
FIG. 4 is a schematic view of the upright vacuum cleaner illustrated in FIG. 1 in a direction.

Referring to FIG. 2 and FIG. 3, the motor assembly 200 mainly includes the motor 22 and the motor housing 21. The motor housing 21 defines an accommodating chamber in which the motor 22 is mounted, and the motor 22 is movably received in the accommodating chamber and is pivotable relative to the motor housing 21. The motor 22 may drive the rotation of a fan to generate a dust suction airflow so as to provide a vacuuming power for the upright vacuum cleaner 1. The motor 22 may further drive the brushroll 11 to rotate around its own axis to achieve a purpose of cleaning the floor. Specifically, the drive belt 13 is provided between the motor 22 and the brushroll 11 and is connected with the motor 22 and the brushroll 11 respectively. The motor 22 drives the brushroll 11 by the drive belt 13.

The body assembly 300 includes a body 31 and a bridging member 32 mounted to the body 31, in which the bridging member 32 is rotatably connected with the motor housing 21 to make the body 31 rotatable between a second upright position and a second oblique position. Referring to FIG. 5, the body assembly 300 mainly includes the body 31 and the bridging member 32. The body 31 is arranged along a vertical direction, and the bridging member 32 is disposed below the body 31 and connected with a lower end of the body 31. The bridging member 32 is mounted to the motor housing 21 and is pivotable relative to the motor housing 21. When a handle of the body 31 is manipulated by hands, for example, moving the body 31 from the second upright position to the second oblique position, the bridging member 32 rotates with respect to the motor housing 21 to push the motor 22 from the first oblique position to the first upright position.

Further, the lever driving device 410 is rotatably disposed to the motor housing 21 and two ends of the lever driving device 410 are configured to be fitted with the bridging member 32 and the motor 22 respectively. When the body 31 is moved from the second upright position to the second oblique position, the bridging member 32 drives the motor 22 to move from the first oblique position to the first upright position by the lever driving device 410. Referring to FIG. 14 to FIG. 31, the lever driving device 410 is connected with the bridging member 32 and a motor casing 222 of the motor 22 respectively. When the body 31 is located at the second upright position, the axis of a motor shaft 221 of the motor 22 is arranged obliquely backwards with respect to the axis of the motor housing 21. That is, the motor 22 is located at the first oblique position. In such a case, two ends of the drive belt 13 are fitted over the brushroll 11 and the motor shaft 221 respectively, but the drive belt 13 is in a loosened state. When the body 31 is located at the second oblique position, the axis of the motor 22 extends along the vertical direction. That is, the motor 22 is at the first upright position, in which case the drive belt 13 is tensioned.

Specifically, when the body 31 is rotated from the second upright position to the second oblique position by hands, the bridging member 32 on the motor housing 21 rotates relative to the motor housing 21 and drives the motor 22 to rotate from the first oblique position to the first upright position by the lever driving device 410. In this process, a lower end of the motor shaft 221 is moved backwards gradually, to increase a distance between the lower end of the motor shaft 221 and the brushroll 11, so as to tension the drive belt 13, thus implementing operations of dust sweep and dust suction.

In this embodiment, when the body 31 is manipulated from the second upright position to the second oblique position at a predetermined angle, the motor 22 may rotate synchronously along with the body 31. When the motor 22 rotates to the predetermined angle, the body 31 may be manipulated by hands freely without any impact on a tensioned state of the drive belt 13. That is, when the motor 22 rotates from the first oblique position to the first upright position, the body 31 may be manipulated by hands freely without affecting the dust sweep and the dust suction of the upright vacuum cleaner 1. Certainly, the present disclosure is not limited to this. The rotation angle of the body 31 may be directly associated with that of the motor 22, i.e. a position state of the motor 22 may be adjusted by adjusting an oblique angle of the body 31 by hands, so as to adjust a tension degree of the drive belt 13.

Thus, in the upright vacuum cleaner 1 according to embodiments of the present disclosure, with the lever driving device 410 being disposed on the motor housing 21 and the two ends of the lever driving device 410 being fitted with the bridging member 32 and the motor 22 respectively, it is possible to realize the rotation of the motor 22 and adjust the tension degree of the drive belt 13, so as to guarantee the normal operation of dust sweep and dust suction. Thus, the upright vacuum cleaner 1 is easy to assemble and disassemble, and may operate stably and reliably with a high working efficiency. Additionally, the motor of the upright vacuum cleaner 1 is arranged vertically to reduce an occupation space of the upright vacuum cleaner 1 and facilitate diverse arrangements of various parts of the upright vacuum cleaner 1. Moreover, the upright vacuum cleaner 1 is convenient to manipulate and occupies a small space.

In some specific embodiments of the present disclosure, the bridging member 32 is provided with a sliding rail 3213, and the sliding rail 3213 defines a sliding-rail tail groove 3214 at a tail end of the sliding rail 3213 by recessing a surface of the tail end of the sliding rail 3213. The lever driving device 410 is configured as a lever rotating member 41e rotatably disposed on the motor housing 21 and having two ends respectively fitted with the sliding rail 3213 and the motor 22. When the body 31 moves from the second upright position to the second oblique position, the body 31 slides a first end of the lever rotating member 41e out from the sliding-rail tail groove 3214 to the sliding rail 3213 by means of the bridging member 32, so as to rotate the lever rotating member 41e, such that a second end of the lever rotating member 41e drives the motor 22 to move from the first oblique position to the first upright position.

In other words, the vertical vacuum cleaner 1 mainly includes the brushroll 11, the motor assembly 200, the body assembly 300 and the lever rotating member 41e. The motor assembly 200 is connected with the brushroll 11, the body assembly 300 and the lever rotating member 41e respectively.

Specifically, the motor housing 21 is provided with a mounting part (not shown) for mounting the lever rotating member 41e. The lever rotating member 41e is rotatably mounted to the mounting part of the motor housing 21, in which the first end of the lever rotating member 41e is fitted with the bridging member 32 and the second end thereof is fitted with the motor casing 222 of the motor 22. When the body 31 moves from the second upright position (i.e. a position of the body 31 shown in FIG. 14) to the second oblique position (i.e. a position of the body 31 shown in FIG. 16), the bridging member 32 rotates along with the movement of the body 31. In such a way, the bridging member 32 drives the rotation of the lever rotating member 41e by pushing the first end of the lever rotating member 41e fitted with the bridging member 32, and meanwhile, the second end of the lever rotating member 41e fitted with the motor casing 222 pushes the motor 22 to rotate from the first oblique position (i.e. a position of the motor 22 shown in FIG. 15) to the first upright position (i.e. a position of the motor 22 shown in FIG. 17).

Therefore, in the upright vacuum cleaner 1 according to embodiments of the present disclosure, with the lever rotating member 41e being disposed on the motor housing 21 and two ends of the lever rotating member 41e being fitted with the bridging member 32 and the motor 22, it is possible to realize the rotation of the motor 22 and adjust the tension degree of the drive belt 13, so as to guarantee the normal operation of dust sweep and dust suction. Moreover, the upright vacuum cleaner 1 is simple in structure, easy to assemble and disassemble, low in cost, and may operate stably and reliably with a high working efficiency. Additionally, the motor 22 of the upright vacuum cleaner 1 is disposed vertically to reduce the occupation space of the upright vacuum cleaner 1 and facilitate diverse arrangements of various parts of the upright vacuum cleaner 1. Furthermore, the upright vacuum cleaner 1 is easy to manipulate and occupies a small space.

Figure 9:
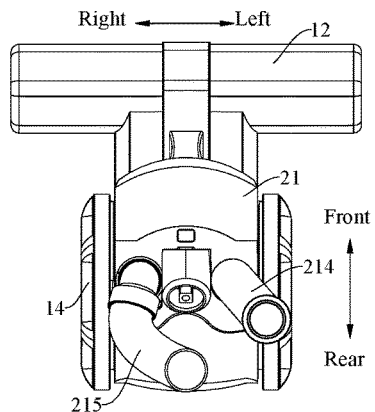
FIG. 9 is a top view of the structure illustrated in FIG. 8.
Figure 15:
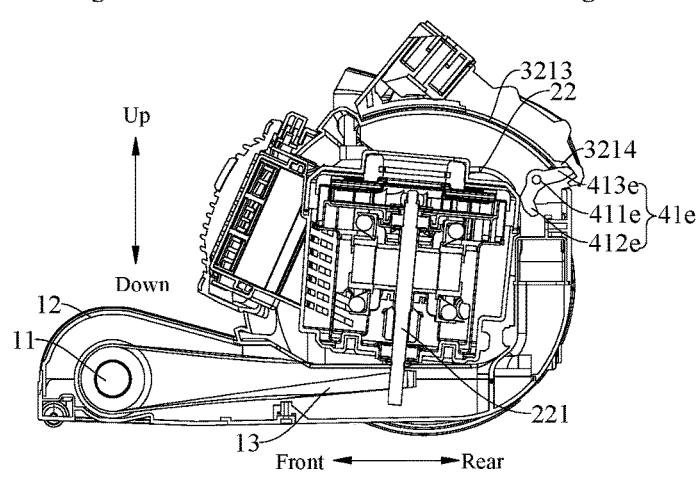
FIG. 15 is a partial view of the upright vacuum cleaner illustrated in FIG. 14.
Figure 17:
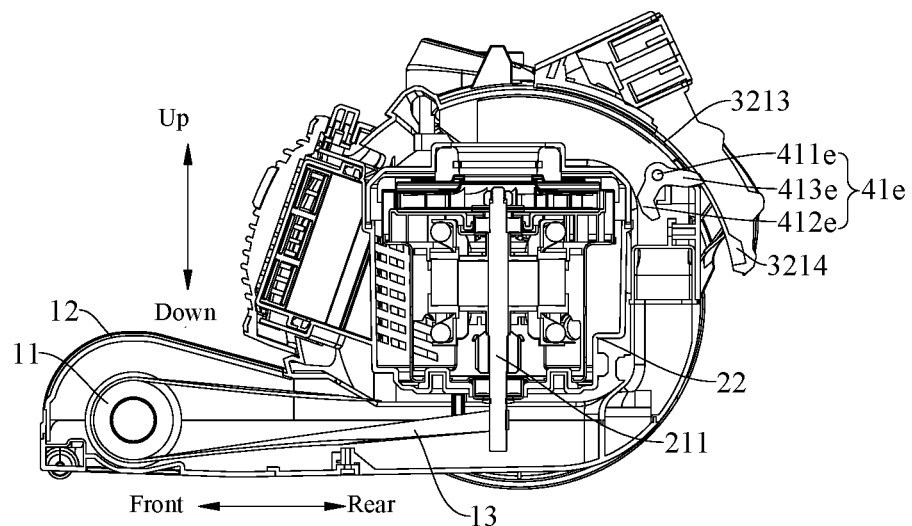
FIG. 17 is a partial view of the upright vacuum cleaner illustrated in FIG. 16.

Optionally, according to an embodiment of the present disclosure, the sliding rail 3213 is configured to be an arc sliding rail 3213 whose central axis is a rotating axis of the bridging member 32. Referring to FIG. 7 and FIG. 9, left and right sides of the motor 22 are pivotably disposed to the motor housing 21 respectively, while the bridging member 32 is erected outside the motor housing 21 and pivotably connected with the motor housing 21. Rotating axes of the motor 22 and the bridging member 32 both extend along a left-and-right direction. The motor 22 and the bridging member 32 both incline forwards or backwards along a front-and-rear direction during their rotation. Advantageously, as shown in FIG. 15 and FIG. 17, a contour of an inner wall of the bridging member 32 is configured to have an arc shape whose central axis is the rotating axis of the bridging member 32, while the sliding rail 3213 of the bridging member 32 is also configured to have an arc shape whose central axis is the rotating axis of the bridging member 32.

When the body 31 moves from the second upright position to the second oblique position, the bridging member 32 rotates along with the movement of the body 31. In such a way, the arc sliding rail 3213 of the bridging member 32 rotates around the rotating axis of the bridging member 32. In this process, the bridging member 32 drives the rotation of the lever rotating member 41e by pushing the first end of the lever rotating member 41e fitted with the bridging member 32, and meanwhile, the second end of the lever rotating member 41e fitted with the motor casing 222 drives the motor 22 to rotate from the first oblique position to the first upright position. Since the sliding rail 3213 of the bridging member 32 is configured as the arc sliding rail 3213 whose central axis is the rotating axis of the bridging member 32, it is possible to drive the lever rotating member 41e to rotate by means of the rotation of the bridging member 32, so as to realize the purpose of pushing the motor 22 to move. Therefore, the drive belt 13 is tensioned to guarantee the normal operation of the upright vacuum cleaner 1.

Preferably, according to an embodiment of the present disclosure, the sliding rail 3213 and the sliding-rail tail groove 3214 are smoothly connected and transmitted to each other via a guide surface. Specifically, when the body 31 is located at the second upright position, the motor 22 is located at the first oblique position. At this moment, the first end of the lever rotating member 41e is located at the tail end of the sliding rail 3213 of the bridging member 32, i.e. located in the sliding-rail tail groove 3214. When the body 31 moves from the second upright position to the second oblique position, the bridging member 32 rotates clockwise to slide the first end of the lever rotating member 41e out from the sliding-rail tail groove 3214 to the sliding rail 3213, so as to rotate the lever rotating member 41e, while the second end of the lever rotating member 41e drives the motor 22 to rotate from the first oblique position to the first upright position.

Consequently, since the sliding rail 3213 and the sliding-rail tail groove 3214 are smoothly transmitted to each other via the guide surface, it is possible to guarantee the stable rotation of the lever rotating member 41e to guarantee the stable rotation of the motor 22. Furthermore, abrasion of the lever rotating member 41e may be reduced and a service life of the lever rotating member 41e may be prolonged.

Figure 18:
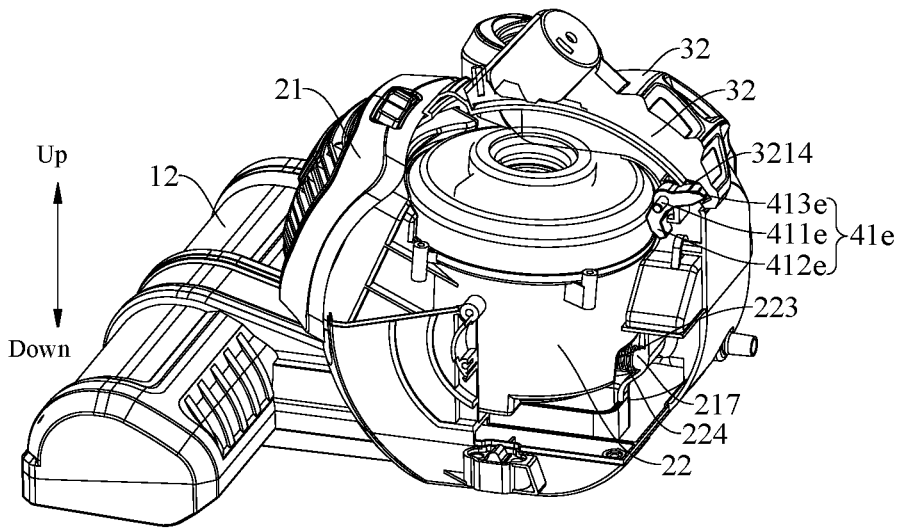
FIG. 18 is an assembling view of a brushroll, a motor assembly and a lever rotating member of the upright vacuum cleaner illustrated in FIG. 14.

In some specific embodiments of the present disclosure, the sliding rail 3213 is formed on an inner top wall of the bridging member 32. Referring to FIG. 18, the inner top wall of the bridging member 32 is provided with the arc sliding rail 3213 whose central axis is the rotating axis of the bridging member 32, and the arc sliding rail 3213 extends along the front-and-rear direction. The sliding-rail tail groove 3214 is located at a rear end of the arc sliding rail 3213, and the lever rotating member 41e is mounted to the motor housing 21 and located behind the motor 22. The first end of the lever rotating member 41e extends out of the motor housing 21 to be fitted with the sliding rail 3213 of the bridging member 32, and the second end of the lever rotating member 41e is located behind the motor 22 and fitted with the motor casing 222 to drive the motor 22 to rotate.

Alternatively, one lever rotating member 41e is provided and opposed to a center of a top end of a side of the motor 22 away from the brushroll 11. That is, the lever rotating member 41e is located right behind the motor 22. When the bridging member 32 rotates, the lever rotating member 41e may provide sufficient power to drive the motor 22 to rotate from the first oblique position to the first upright position.

According to an embodiment of the present disclosure, the lever rotating member 41e includes a rotational mounting part 411e, a first actuating part 412e and a second actuating part 413e. Specifically, the rotational mounting part 411e is rotatably connected to the motor housing 21. The first actuating part 412e and the second actuating part 413e are fixed to both sides of the rotational mounting part 411e in a same axial section thereof and extend away from each other. The first actuating part 412e is fitted with the motor 22, while the second actuating part 413e is fitted with the sliding rail 3213.

In other words, the lever rotating member 41e mainly includes the rotational mounting part 411e, the first actuating part 412e and the second actuating part 413e. The first actuating part 412e and the second actuating part 413e are connected with two sides of the rotational mounting part 411e respectively. The rotational mounting part 411e is rotatably disposed to the mounting part of the motor housing 21. The first actuating part 412e extends towards the motor 22 and is fitted with the motor casing 222, while the second actuating part 413e extends out of the motor housing 21 and towards the bridging member 32 to be fitted with the sliding rail 3213 of the bridging member 32.

When the body 31 moves from the second upright position to the second oblique position, the bridging member 32 rotates along with the movement of the body 31. In such a way, the arc sliding rail 3213 of the bridging member 32 rotates around the rotating axis of the bridging member 32. In this process, the second actuating part 413e slides out from the sliding-rail tail groove 3214 to the sliding rail 3213, i.e. the lever rotating member 41e is rotated, and meanwhile, the first actuating part 412e of the lever rotating member 41e pushes the motor 22 to rotate from the first oblique position to the first upright position.

Therefore, the lever rotating member 41e is easy to process, manufacture, assemble and disassemble due to a simple structure thereof. By mounting the lever rotating member 41e to the motor housing 21, it is possible to realize a fit between the bridging member 32 and the motor 22, so as to transmit motion and force and guarantee continuity and stability of motion.

Preferably, according to an embodiment of the present disclosure, a surface of the second actuating part 413e fitted with the sliding rail 3213 is configured as a first smooth curved surface, while a surface of the first actuating part 412e fitted with the motor 22 is configured as a second smooth curved surface.

Since the surface of the second actuating part 413e fitted with the sliding rail 3213 is configured as the first smooth curved surface and the surface of the first actuating part 412e fitted with the motor 22 is configured as the second smooth curved surface, it is possible to guarantee the continuity and stability of motion, so as to guarantee the stable rotation of the motor 22. Moreover, the abrasion of the lever rotating member 41e may be reduced and the service life of the lever rotating member 41e may be prolonged.

In some other specific embodiments of the present disclosure, the lever driving device 410 is a lever cam member 41b (41c), and the lever cam member 41b (41c) is rotatably connected to a top wall and/or a side wall of the motor housing 21. Preferably, the motor housing 21 is provided with two lever cam members 41b (41c) positioned symmetrically with each other, each lever cam member 41b (41c) is fitted with the motor 22 and the bridging member 32 separately. When the body 31 is rotated from the second upright position to the second oblique position by hands, the bridging member 32 on the motor housing 21 rotates relative to the motor housing 21 and drives the motor 22 to rotate from the first oblique position to the first upright position by the two lever cam members 41b (41c).

For example, the two lever cam members 41b (41c) are located at left and right sides of the central axis of the motor 22 respectively, and the two lever cam members 41c are connected to the top wall of the motor housing 21 separately and pivotable in a horizontal plane, or otherwise, the two lever cam members 41b are connected to the side walls of the motor housing 21 and pivotable in a vertical plane, thus realizing transmissions of motion and force. Certainly, the present disclosure is not limited to this.

Thus, by providing the lever cam members 41b (41c) arranged axially symmetrically at two sides of a central line of the motor assembly 200, it is possible to provide sufficient power to drive the motor 22, and reduce a force acted on a single lever cam member 41b (41c). Thus, the using reliability of the lever cam member 41b (41c) may be improved, and also, the motor 22 may be subject to an even force when rotating, thereby improving stability of the structure and enhancing using stability of the vertical vacuum cleaner 1.

Figure 19:
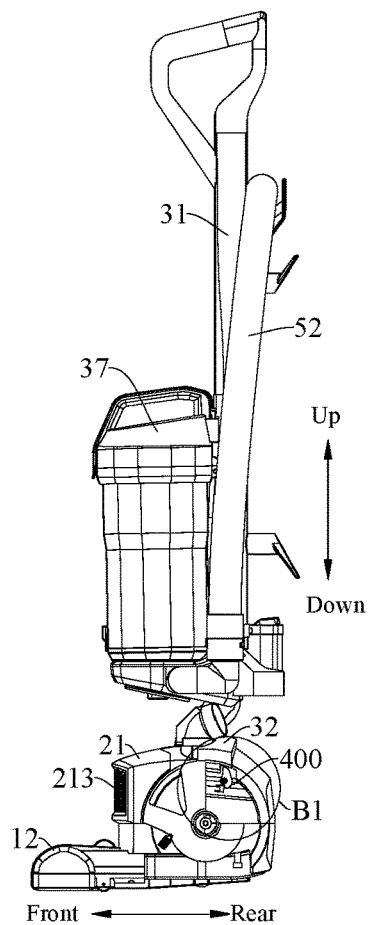
FIG. 19 is a schematic view of an upright vacuum cleaner according to an embodiment of the present disclosure, in which a body of the upright vacuum cleaner is located at a second upright position.
Figure 26:
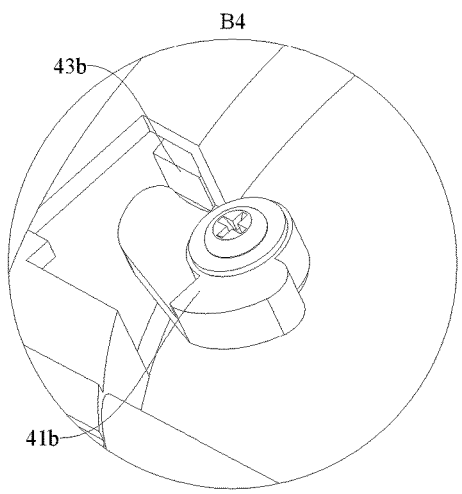
FIG. 26 is an enlarged view of part B4 in FIG. 25.
Figure 27:
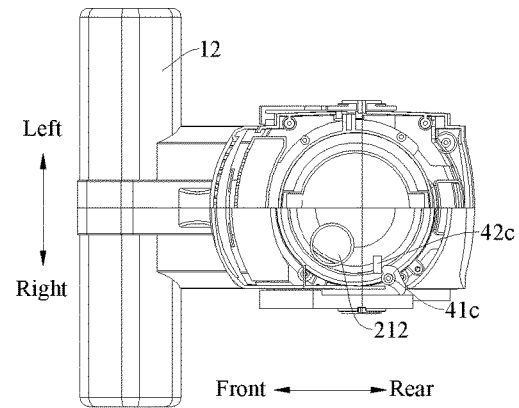
FIG. 27 is a partial assembling view of an upright vacuum cleaner according to another embodiment of the present disclosure.

In some specific examples of the present disclosure, two lever cam members 41b are symmetrically provided at two side walls of the motor housing 21. Referring to FIG. 19 and FIG. 26, the two lever cam members 41b are disposed to opposite inner side walls of the motor housing 21 respectively and spaced apart from one another along the left-and-right direction, each lever cam member 41b is rotatable in a corresponding vertical plane, and the two lever cam members 41b rotate around the same rotating axis.

According to an embodiment of the present disclosure, the lever cam member 41b includes a rotational connecting portion 411b, a first actuating portion 412b and a second actuating portion 413b. Specifically, the rotational connecting portion 411b is rotatably connected to the motor housing 21, and the first actuating portion 412b and the second actuating portion 413b are respectively disposed at two sides of the rotational connecting portion 411b in a same axial section thereof and extend away from each other. The first actuating portion 412b is fitted with the motor 22, and the second actuating portion 413b is fitted with the bridging member 32.

In other words, the lever cam member 41b mainly includes the rotational connecting portion 411b, the first actuating portion 412b and the second actuating portion 413b. The first actuating portion 412b and the second actuating portion 413b are disposed at two sides of the rotational connecting portion 411b respectively, and connected with opposite side walls of the rotational connecting portion 411b respectively. The rotational connecting portion 411b of the lever cam member 41b is rotatably disposed to the motor housing 21, the first actuating portion 412b of the lever cam member 41b is fitted with the motor casing 222 of the motor 22, and the second actuating portion 413b of the lever member 43d is fitted with the inner wall of the bridging member 32. When the body 31 is rotated from the second upright position to the second oblique position by hands, the bridging member 32 on the motor housing 21 rotates relative to the motor housing 21 and drives the rotation of the lever cam member 41b around its rotating axis by driving the second actuating portion 413b, and then the first actuating portion 412b of the lever cam member 41b pushes the motor 22 to rotate from the first oblique position to the first upright position. In this process, a lower end of the motor shaft 221 is moved backwards gradually, to increase the distance between the lower end of the motor shaft 221 and the brushroll 11, so as to tension the drive belt 13, thus implementing the operations of dust sweep and dust suction.

Alternatively, a maximum distance between the second actuating portion 413b and a center of the rotational connecting portion 411b is less than a maximum distance between the first actuating portion 412b and the center of the rotational connecting portion 411b. That is, a distance between a free end of the second actuating portion 413b and a rotation center of the lever cam member 41b is greater than a distance between a free end of the first actuating portion 412b and the rotation center of the lever cam member 41b. When the bridging member 32 rotates, the free end of the second actuating portion 413b abuts against the bridging member 32, so as to drive the lever cam member 41b to rotate around the center of the rotational connecting portion 411b. Thus, the first actuating portion 412b drives the motor 22 to rotate from the first oblique position to the first upright position, thereby tensioning the drive belt 13. A width of the first actuating portion 412b is decreased gradually along a direction running away from the rotational connecting portion 411b, and a width of the second actuating portion 413b is also decreased gradually along another direction running away from the rotational connecting portion 411b. A contour of the free end of the first actuating portion 412b is configured to have an arc shape, and a contour of the free end of the second actuating portion 413b is also configured to have an arc shape. Thus, it is convenient for the first actuating portion 412b to be fitted with the motor 22 and for the second actuating portion 413b to be fitted with the bridging member 32 respectively, so as to guarantee the stable and reliable movement.

Figure 25:
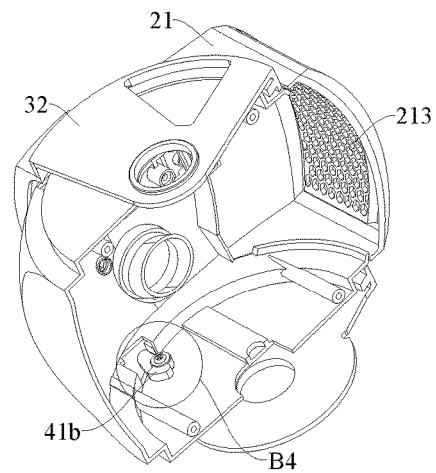
FIG. 25 is an assembling view of a motor housing and a lever cam member of the upright vacuum cleaner illustrated in FIG. 19.

Further, one of the motor housing 21 and the rotational connecting portion 411b is fixedly provided with a rotating shaft, and the other of the motor housing 21 and the rotational connecting portion 411b has a hole in which the rotating shaft 44b is fitted. Referring to FIG. 25, the opposite inner side walls of the motor housing 21 are provided with the rotating shaft respectively, and the rotational connecting portion 411b of the lever cam member 41b has the hole in which the rotating shaft is fitted. Thus, it is possible to achieve a rotatable connection of the lever cam member 41b and the motor housing 21, and such connection has a simple structure and a low cost, is easy to assemble and disassemble, and is convenient to achieve.

Figure 20:
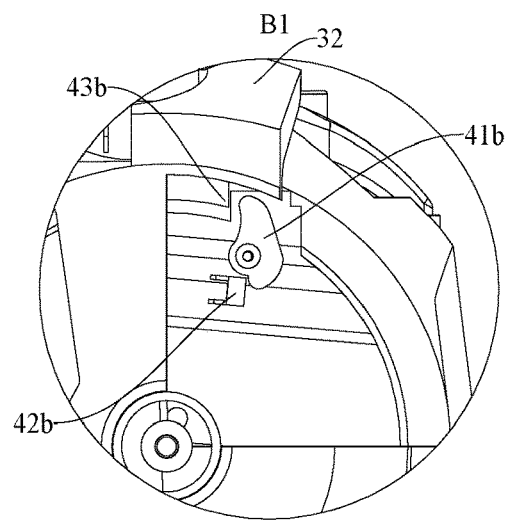
FIG. 20 is an enlarged view of part B1 in FIG. 19.
Figure 21:
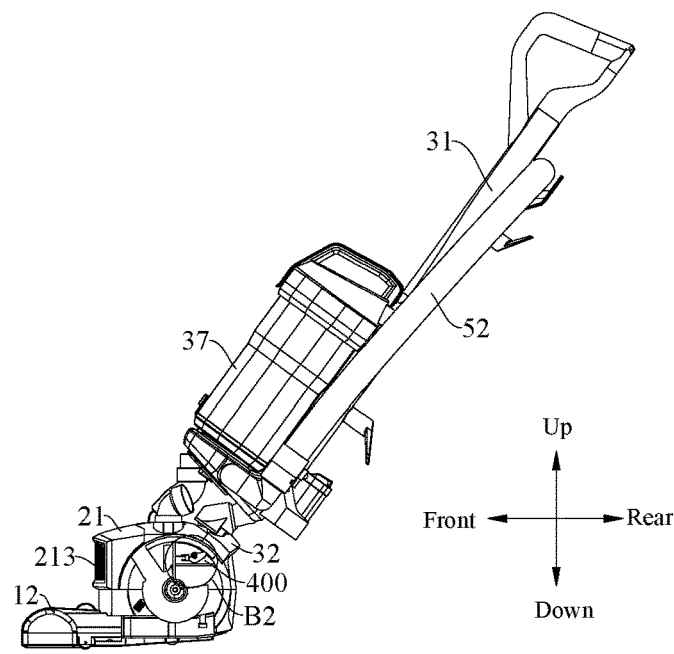
FIG. 21 is a schematic view of the upright vacuum cleaner illustrated in FIG. 19, in which the body of the upright vacuum cleaner is located at a second oblique position.
Figure 22:
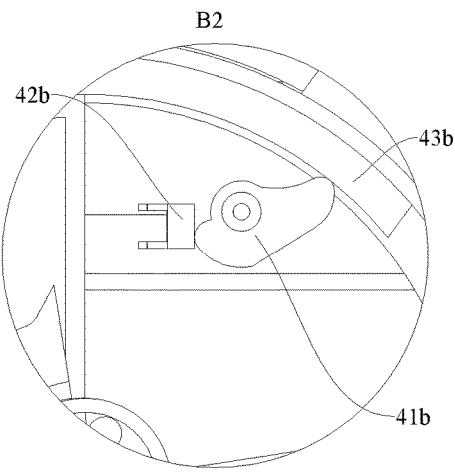
FIG. 22 is an enlarged view of part B2 in FIG. 21.

According to an embodiment of the present disclosure, the motor 22 is provided with a first contact block 42b fitted with the first actuating portion 412b. Alternatively, the first contact block 42b is configured to be a rectangular block in the vertical plane. Two first contact blocks 42b are provided at left and right side walls of the motor casing 222 of the motor 22, and the first actuating portions 412b of the two lever cam member 41b abut against the first contact blocks 42b at corresponding positions respectively. Advantageously, according to an embodiment of the present disclosure, the lever cam member 41b is provided with a retaining groove 414b. When the motor 22 is located at the first oblique position, the first contact block 42b is fitted in the retaining groove 414b. Referring to FIG. 20 and FIG. 22, the retaining groove 414b is formed in a side of the first actuating portion 412b of the lever cam member 41b facing the first contact block 42b, and an end of the first contact block 42b is configured to be fitted with the retaining groove 414b. Therefore, forming the retaining groove 414b in the lever cam member 41b is beneficial for the first actuating portion 412b of the lever cam member 41b to drive the first contact block 42b, thus ensuring the reliable connection between the lever cam member 41b and the motor 22, and further improving the use reliability of the upright vacuum cleaner 1.

Figure 23:
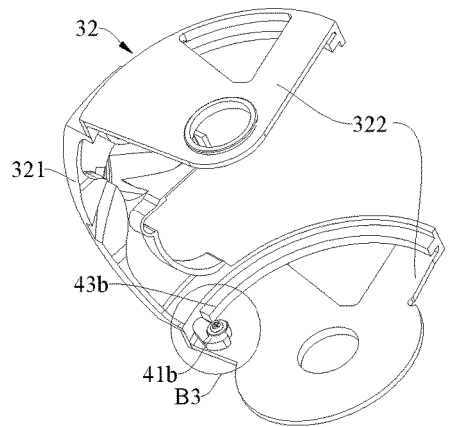
FIG. 23 is an assembling view of a bridging member and a lever cam member of the upright vacuum cleaner illustrated in FIG. 19.
Figure 24:
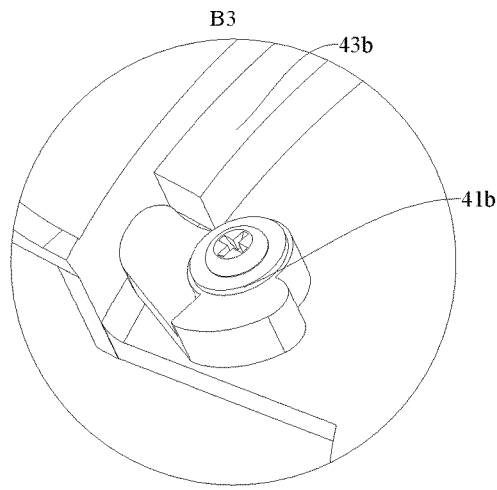
FIG. 24 is an enlarged view of part B3 in FIG. 23.

According to an embodiment of the present disclosure, the bridging member 32 is provided with a second contact block 43b fitted with the second actuating portion 413b. Referring to FIG. 23, the second contact block 43b is fixed to each of two opposite inner side walls of the bridging member 32, and the second actuating portions 413b of the two lever cam members 41b always abut against the second contact blocks 43b at corresponding positions, such that the bridging member 32 may push the lever cam member 41b to rotate, so as to allow the motor 22 to be rotated from the first oblique position to the first upright position, thus tensioning the drive belt 13. Alternatively, the second contact block 43b is configured as an arc block, and extends along a circumferential direction of the rotational connecting portion 411b, so as to guarantee the reliable connection between the bridging member 32 and the second contact block 43b.

In some other specific embodiments of the present disclosure, two lever cam members 41c are provided to the top wall of the motor housing 21 and spaced apart from each other. Referring to FIGS. 27 to 31, a first contact block 42c is fixed to the top wall of the motor casing 222 of the motor 22, a second contact block 43c is fixed to a side of the bridging member 32 opposite to the motor housing 21, and the lever cam member 41c is rotatably disposed to the top wall of the motor housing 21 and located between the first contact block 42c and the second contact block 43c. The first actuating portion 412c of the lever cam member 41c is fitted with the first contact block 42c, and the second actuating portion 413c of the lever cam member 41c is fitted with the second contact block 43c. When the body 31 is rotated from the second upright position to the first oblique position by hands, the bridging member 32 on the motor housing 21 rotates clockwise relative to the motor housing 21, the second contact block 43c on the bridging member 32 moves backwards relative to the lever cam member 41c to push the second actuating portion 413c of the lever cam member 41c, so that the lever cam member 41c is driven to rotate counterclockwise in the horizontal plane. Meanwhile, the first actuating portion 412c of the lever cam member 41c pushes the first contact block 42c forwards, so as to rotate the motor 22 from the first oblique position to the first upright position. In this process, the lower end of the motor shaft 221 is moved backwards gradually, to increase the distance between the lower end of the motor shaft 221 and the brushroll 11, thus tensioning the drive belt 13.

Figure 30:
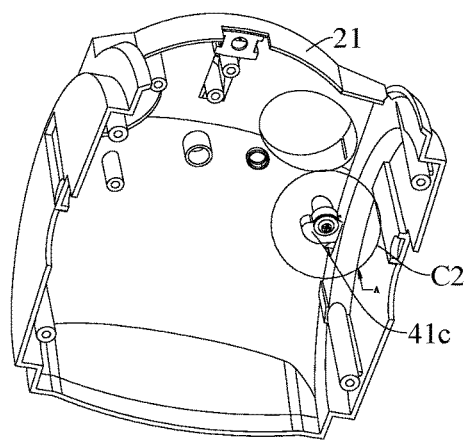
FIG. 30 is an assembling view of a motor housing and a lever cam member of the upright vacuum cleaner illustrated in FIG. 27.
Figure 31:
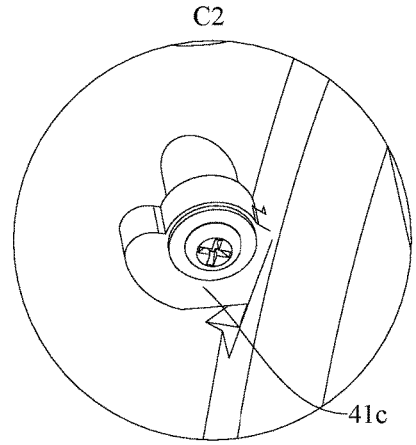
FIG. 31 is an enlarged view of part C2 in FIG. 30.
Figure 32:
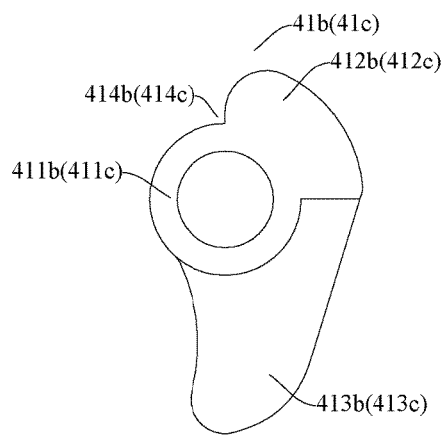
FIG. 32 is a front view of a lever cam member of an upright vacuum cleaner according to an embodiment of the present disclosure.
Figure 33:
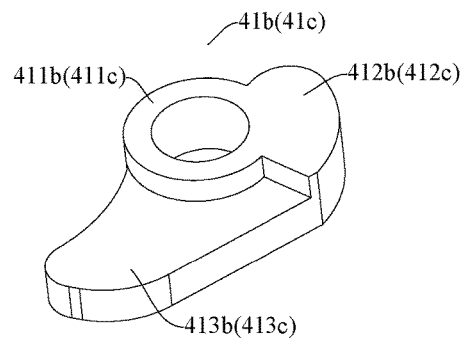
FIG. 33 is a perspective view of the lever cam member of the upright vacuum cleaner illustrated in FIG. 32.

Optionally, according to an embodiment of the present disclosure, the lever cam member 41c is rotatably connected to the top wall of the motor housing 21 and the second actuating portion 413c of the lever cam member 41c passes through the side wall of the motor housing 21. Referring to FIG. 30, the lever cam member 41c is rotatably disposed to the inner surface of the top wall of the motor housing 21 and located adjacent to the side wall of the motor housing 21. The motor 22 is located below the lever cam member 41c, and the first contact block 42c on the motor casing 222 of the motor 22 is disposed opposite to the first actuating portion 412c of the lever cam member 41c, so that the first contact block may be retained in the retaining groove 414c of the lever cam member 41c. The second actuating portion 413c of the lever cam member 41c passes through the side wall of the motor housing 21 and is fitted with the second contact block 43b on the bridging member 32.

Therefore, by providing two lever cam members 41c to the top wall of the motor housing 21, it is possible to provide sufficient power to drive the motor 22, to ensure that the motor 22 is subject to an even force when rotating and further to guarantee the stability of the structure, thus improving the use reliability of the upright vacuum cleaner 1. Certainly, the present disclosure is not limited to this. One or more lever cam members 41c may be provided, the lever cam member 41c may be arranged at other positions except the top wall and the side wall of the motor housing 21, and the first contact block 42c and the second contact block 43c may be formed as other structures that are fitted with two ends of the lever cam member 41c respectively.

As shown in FIG. 18, in some specific examples of the present disclosure, an elastic member is provided between the motor 22 and the motor housing 21. The elastic member is configured to push the motor 22 to rotate from the first upright position to the first oblique position when the body 31 moves from the second oblique position to the second upright position.

Therefore, by providing the elastic member between the motor housing 21 and the motor 22, it is possible to push the motor 22 to move from the first upright position to the first oblique position so as to implement a position regulation, and also to reduce a mechanical vibration of the motor 22 during rotation thereof so as to avoid heavy collision and reduce a noise generated during motion.

Alternatively, the motor 22 includes a first column 223, the motor housing 21 includes a second column 217, and the elastic member is a spring 224 whose two ends are fitted over the first column 223 and the second column 217, so as to constantly apply a push force on the motor 22 towards the first oblique position.

Referring to FIG. 18, the first column 223 is provided to the outer side wall of the motor 22 at a rear side and extends backwards, the second column 217 is provided to the inner side wall of the motor housing 21 at the rear side and extends forwards, and two ends of the spring 224 are fitted over the first column 223 and the second column 217, which provides a simple structure and is easy to assemble or disassemble, also reduces vibration and decreases noise, and further improves the reliability and quality of the upright vacuum cleaner 1.

According to an embodiment of the present disclosure, the motor 22 rotates from the first oblique position to the first upright position by an angle of 1° to 10°. Referring to FIG. 2, when the body 31 is located at the second upright position, the axis of the motor shaft 221 of the motor 22 is arranged obliquely backwards with respect to the axis of the motor housing 21. That is, the motor 22 is at the first oblique position with an oblique angle of 1° to 10°. For example, the oblique angle may be 1°, 6° or 10°. In such a case, two ends of the drive belt 13 are fitted over the brushroll 11 and the motor shaft 221 respectively, but the drive belt 13 is in the loosened state. Referring to FIG. 3, when the body 31 is located at the second oblique position, the axis of the motor 22 extends along the vertical direction. That is, the motor 22 is at the first upright position, in which case the drive belt 13 is tensioned.

When the body 31 is manipulated from the second upright position to the second oblique position at a predetermined angle, the motor 22 may rotate synchronously along with the body 31. When the body 31 rotates to the predetermined angle, the motor 22 rotates from the first oblique position to the first upright position, and the drive belt 13 is tensioned. Afterwards, the body 31 may be manipulated freely by hands and the drive belt 13 keeps in the tensioned state, so as to guarantee the normal operation of the dust sweep and the dust suction of the upright vacuum cleaner 1. When the body 31 is rotated from the second oblique position to the second upright position by hands, the drive belt 13 is loosened to stop the dust sweep and the dust suction of the upright vacuum cleaner 1.

Alternatively, according to an embodiment of the present disclosure, the motor 22 rotates from the first oblique position to the first upright position by an angle of 3° to 8°. For example, when the upright vacuum cleaner 1 is in an initial state (i.e. the body 31 is at the second upright position), the central axis of the motor 22 inclines backwards by an angle of 3° to 8° with respect to the vertical direction (i.e. an up-and-down direction shown in FIG. 2). When the body 31 is pulled backwards by hands, in an initial angle range of 3° to 8°, the motor 22 rotates synchronously along with the body 31. When the motor 22 rotates to the first upright position, the body 31 may swing freely in a certain angle range to adjust a motion direction of the upright vacuum cleaner 1, and at this moment, the upright vacuum cleaner 1 starts vacuuming. When the body 31 is pulled forwards by hands, the body 31 rotates from the second oblique position at the predetermined angle relative to the vertical direction to the second upright position, the motor 22 rotates from the first upright position to the first oblique position at the predetermined angle, and the drive belt 13 changes from the tensioned state to the loosened state, such that the upright vacuum cleaner 1 stops vacuuming.

Preferably, according to an embodiment of the present disclosure, the motor 22 rotates from the first oblique position to the first upright position by an angle of 5°. Thus, the drive belt 13 is tensioned to a proper extent, which can guarantee the reliable and stable operation of the system, and also avoid accelerating the failure of the drive belt 13 due to excessive tension, thus extending the service life of the drive belt 13.

The upright vacuum cleaner 1 further includes a tensioning wheel 14 or another elastic member for adjusting a degree of tensioning the drive belt 13. Referring to FIG. 2, the tensioning wheel 14 is disposed at a top wall of a brushroll casing 12 of the upright vacuum cleaner 1, located above the drive belt 13 and disposed adjacent to the brushroll 11, so as to adjust the degree of tensioning the drive belt 13. Further, the elastic member is also disposed to an inner top wall of the brushroll casing 12 and has two ends connected with the brushroll casing 12 and the tensioning wheel 14, such that the elastic member and the tensioning wheel 14 can tension the drive belt 13 according to practical operation conditions, thus ensuring the operation reliability of the system.

Consequently, by providing the tensioning wheel 14 or the elastic member in the brushroll casing 12, it is possible to adjust a tightness degree of the drive belt 13 to make the system operate reliably and also to stabilize the operation of the drive belt 13 to prevent the drive belt 13 from slipping, thus ensuring the normal operation of the upright vacuum cleaner 1.

Figure 28:
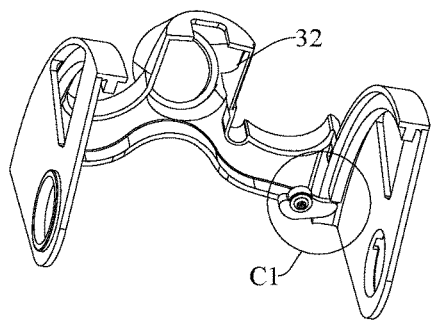
FIG. 28 is an assembling view of a bridging member and a lever cam member of the upright vacuum cleaner illustrated in FIG. 27.
Figure 29:
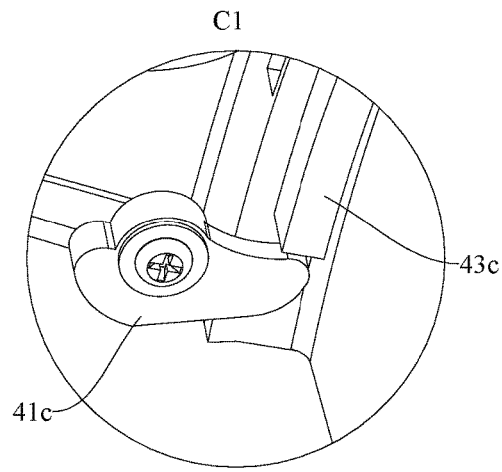
FIG. 29 is an enlarged view of part C1 in FIG. 28.

In some specific embodiments of the present disclosure, the bridging member 32 and the body 31 are processed and molded separately, and connected by assembling. Referring to FIG. 28, the bridging member 32 has a sleeve in middle thereof, and hence the bridging member 32 may be fitted over the body 31 by the sleeve, such that a user may change a direction of the upright vacuum cleaner 1 easily with simple manipulations when manipulating the body 31.

In some other specific embodiments of the present disclosure, the bridging member 32 and the body 31 are processed and molded integrally. Thus, the structure formed integrally guarantees the stability of structure and performance of the upright vacuum cleaner 1, and also is easy to mold and simple to manufacture. Moreover, the structure formed integrally saves redundant parts and connecting procedures, so as to improve the assembling efficiency of the upright vacuum cleaner 1 considerably and guarantee the reliability of connecting the bridging member 32 with the body 31. Furthermore, the structure formed integrally has high overall strength and stability as well as the long service life, and is easy to assemble.

Alternatively, the motor 22 may be disposed near the floor. That is, a gravity center of the motor 22 is lower than that of the motor 22 of the vacuum cleaner in the related art, such that, for the vacuum cleaners having the body 31 of the same length, the user may manipulate the upright vacuum cleaner 1 in the present disclosure conveniently with less effort. A switch on the body 31 of the upright vacuum cleaner 1 may be controlled by hands to start or stop the upright vacuum cleaner 1. When the upright vacuum cleaner 1 is started, the motor 22 drives the fan and the brushroll 11 simultaneously to rotate, so as to provide the vacuuming power. That is, above actions may be completed by one click of the user, thus providing simple and convenient manipulations.

The rotating axis of the motor 22 and the rotating axis of the brushroll 11 are arranged in a non-parallel manner, and the motor 22 drives the brushroll 11 to roll via the drive belt 13. Specifically, as shown in FIG. 1, the rotating axis of the brushroll 11 extends along a horizontal direction (i.e. the left-and-right direction as shown in FIG. 1), and the rotating axis of the motor 22 and the rotating axis of the brushroll 11 are arranged in the non-parallel manner. For example, the rotating axis of the motor 22 may extend along a vertical direction (i.e. an up-and-down direction as shown in FIG. 2) or be arranged obliquely with respect to the vertical direction. The drive belt 13 is provided between the motor 22 and the brushroll 11. The drive belt 13 is winded upon the motor shaft 221 of the motor 22 and the brushroll 11 to drive the brushroll 11.

Alternatively, the motor 22 may be disposed near the floor. That is, the gravity center of the motor 22 is lower than that of the motor 22 of the vacuum cleaner in the related art, such that, for the vacuum cleaners having the body 31 of the same length, the user may manipulate the upright vacuum cleaner 1 in the present disclosure conveniently with less effort. A switch on the body 31 of the upright vacuum cleaner 1 may be controlled by hands to start or stop the upright vacuum cleaner 1. When the upright vacuum cleaner 1 is started, the motor 22 drives the fan and the brushroll 11 to rotate simultaneously to provide the vacuuming power. That is, above process may be completed by one action of the user, thus providing simple and convenient manipulations.

Thus, the rotating axis of the motor 22 and the rotating axis of the brushroll 11 are arranged in the non-parallel manner, so as to reduce a volume of the motor 22 and hence an occupation space of the upright vacuum cleaner 1, thus facilitating diverse arrangements of various parts of the upright vacuum cleaner 1. Further, the upright vacuum cleaner 1 controls the rotation of the brushroll 11 and the fan simultaneously by one motor 22, which occupies a small space with few parts but realizes synchronous control over the dust sweep and the dust suction. Additionally, the motor of the upright vacuum cleaner 1 is disposed vertically to further reduce the occupation space of the upright vacuum cleaner 1 and facilitate diverse arrangements of various parts of the upright vacuum cleaner 1. The vertical vacuum cleaner 1 is simple and compact in structure, convenient to manipulate, and occupies a small space.

In an example of the present disclosure, the rotating axis of the motor 22 is arranged perpendicular to the rotating axis of the brushroll 11, that is, the rotating axis of the brushroll 11 is arranged perpendicular to the motor shaft 221, and the drive belt 13 is arranged with a twist angle of 90°. Referring to FIG. 1, the brushroll 11 is disposed in the horizontal plane and the rotating axis of the brushroll 11 extends along the horizontal direction. The motor 22 is disposed vertically in the motor housing 21 and the motor shaft 221 of the motor 22 is located in the vertical plane perpendicular to the rotating axis of the brushroll 11. That is, the rotating axis of the motor shaft 221 of the motor 22 and the rotating axis of the brushroll 11 are perpendicular to each other, so an upper half circle of the drive belt 13 and a lower half circle of the drive belt 13 are both twisted between the brushroll 11 and the motor shaft 221 for one time, and a twist angle between two ends of each half circle of the drive belt 13 is 90°.

Alternatively, according to an embodiment of the present disclosure, the motor shaft 221 of the motor 22 is arranged vertically. Specifically, the motor 22 mainly includes a motor body and a motor casing 222. The motor body is disposed in the motor casing 222 and mainly includes a core and the motor shaft 221. The motor shaft 221 of the motor 22 is connected with the core of the motor 22, and the motor 22 is arranged vertically. When the upright vacuum cleaner 1 is in a non-working state, an upper end of the motor shaft 221 is inclined backwards relative to the vertical direction (i.e. the up-and-down direction shown in FIG. 3). During the dust suction process of the upright vacuum cleaner 1, a central axis of the motor shaft 221 extends along the vertical direction. That is, an end of the motor shaft 221 of the upright vacuum cleaner 1 may extend downwards relative to the core along the vertical direction (i.e. the up-and-down direction shown in FIG. 3). A first end of the drive belt 13 is fitted over the lower end of the motor shaft 221 and a second end of the drive belt 13 is fitted over the brushroll 11. Because the rotating axis of the brushroll 11 is arranged in the horizontal plane, the drive belt 13 is twisted for at least one time between the brushroll 11 and the motor shaft 221. That is, the twist angle of the drive belt 13 between a direction-changing contact point of the drive belt 13 and the motor shaft 221 and a direction-changing contact point of the drive belt 13 and the brushroll 11 is 90°.

When the body 31 is located at the upright position, the axis of the motor shaft 221 of the motor 22 is arranged obliquely backwards relative to the axis of the motor housing 21, in which case the two ends of the drive belt 13 are fitted over the motor shaft 221 and the brushroll 11 respectively, but the drive belt 13 is loosened. When the body 31 is located at the oblique position, the axis of the motor 22 extends along the vertical direction. That is, the motor 22 is located in an upright state, in which case the drive belt 13 is tensioned. Specifically, when the body 31 is rotated from the upright position to the oblique position by hands, the lower end of the motor shaft 221 moves backwards gradually, so as to increase the distance between the lower end of the motor shaft 221 and the brushroll 11, thus tensioning the drive belt 13.

The brushroll 11 includes a first brushroll section 111 provided with bristles, a second brushroll section 112 provided with bristles, and a connecting-shaft section 113 connected between the first brushroll section 111 and the second brushroll section 112. In other words, the brushroll 11 mainly includes the first brushroll section 111, the second brushroll section 112 and the connecting-shaft section 113. An end of the first brushroll section 111 and an end of the second brushroll section 112 are connected with two ends of the connecting-shaft section 113 respectively.

Referring to FIG. 1 and FIG. 2, the brushroll 11 is rotatably provided in the brushroll casing 12 and connected with the motor 22 to be driven to rotate around a rotating axis of the brushroll 11. The first brushroll section 111, the second brushroll section 112 and the connecting-shaft section 113 are configured to have a column shape extending along the horizontal direction (i.e. the left-and-right direction shown in FIG. 34). A right end of the first brushroll section 111 is connected with a left end of the connecting-shaft section 113, and a left end of the second brushroll section 112 is connected with a right end of the connecting-shaft section 113. Bristles may be provided to respective outer side walls of the first brushroll section 111 and the second brushroll section 112 to clean the floor, but no bristle is provided on the connecting-shaft section 113 to facilitate connection with the drive belt 13.

Further, the drive belt 13 is winded upon the motor shaft 221 of the motor 22 and the connecting-shaft section 113, such that the brushroll 11 may be driven to roll by the motor 22. Referring FIG. 2, the motor 22 is provided in the motor housing 21 of the vacuum cleaner and is connected with the fan and the brushroll 11 respectively. The motor 22 may drive the fan to rotate to generate an airflow so as to provide a vacuuming power for the upright vacuum cleaner 1, and the motor 22 may also drive the brushroll 11 to rotate around its own axis so as to realize the purpose of cleaning the floor.

Referring to FIG. 2, the brushroll 11 and the motor 22 are spaced apart from each other in a front-and-rear direction, and the brushroll 11 is located at a front side of the motor 22. The first end of the drive belt 13 is fitted over the motor shaft 221 of the motor 22, while the second end of the drive belt 13 is fitted over the connecting-shaft section 113 of the brushroll 11. When the motor shaft 221 of the motor 22 rotates, the motor shaft 221 drives the drive belt 13 to move due to a frictional resistance between the motor shaft 221 and a surface of the drive belt 13. Similarly, the drive belt 13 drives the brushroll 11 to rotate around its own axis due to a frictional resistance between the connecting-shaft section 113 of the brushroll 11 and the surface of the drive belt 13. Thus, the motor 22 may drive the brushroll 11 to rotate.

Preferably, according to an embodiment of the present disclosure, the first brushroll section 11 and the second brushroll section 11 are arranged symmetrically with respect to the drive belt 13. That is, the first brushroll section 111 has a same length in the axial direction as the second brushroll section 112. The first brushroll section 111 and the second brushroll section 112 are arranged symmetrically with respect to a central part of the connecting-shaft section 113. The first end of the drive belt 13 is winded upon the motor shaft 221 of the motor 22, and the second end of the drive belt 13 is winded upon the connecting-shaft section 113. That is, the drive belt 13 divides the brushroll 11 into the first brushroll section 111 and the second brushroll section 112 symmetric with each other in the left-and-right direction. Consequently, the first brushroll section 111 and the second brushroll section 112 may be subjected to balanced resistances to guarantee the stability of rotation of the brushroll 11, and also, same cleaning scopes are provided at two sides of the drive belt 13.

Further, respective central axes of the first brushroll section 111, the second brushroll section 112 and the connecting-shaft section 113 are located in a same line. That is, the first brushroll section 111, the second brushroll section 112 and the connecting-shaft section 113 are arranged coaxially. The motor 22 drives the first brushroll section 111, the second brushroll section 112 and the connecting-shaft section 113 to rotate simultaneously via the drive belt 13, such that the motor 22 of the upright vacuum cleaner 1 may drive the fan as well as the first brushroll section 111, the second brushroll section 112 and the connecting-shaft section 113 to rotate simultaneously, so as to implement an operation mode in which the dust sweep and the dust suction are performed at both sides of the drive belt 13. Compared with the vacuum cleaner in the related art that controls the fan and the brushroll 11 to rotate respectively by two motors 22, the upright vacuum cleaner 1 in the present disclosure has the simple structure and few parts, so the upright vacuum cleaner 1 occupies the small space and is easy to assemble or disassemble, which improves the assembling efficiency. Furthermore, the upright vacuum cleaner 1 in the present disclosure may realize synchronous control over the dust sweep and the dust suction.

Further, the vertical vacuum cleaner 1 also includes the brushroll casing 12 covering the brushroll 11. The brushroll casing 12 defines a drive-belt mounting chamber 123, a first air-suction channel 1221 and a second air-suction channel 1222. The drive-belt mounting chamber 123 is configured to accommodate the connecting-shaft section 113 and the drive belt 13. The first air-suction channel 1221 and the second air-suction channel 1222 are located at both sides of the drive-belt mounting chamber and separated from the drive-belt mounting chamber. Referring to FIG. 7 to FIG. 9, the brushroll casing 12 is configured to have a T shape, and has the first air-suction channel 1221, the second air-suction channel 1222 and the drive-belt mounting chamber 123 spaced apart from one another along the left-and-right direction. The first brushroll section 111 is rotatably provided in the first air-suction channel 1221, the second brushroll section 112 is rotatably provided in the second air-suction channel 1222, and the drive belt 13 is movably provided in the drive-belt mounting chamber 123.

Optionally, the first air-suction channel 1221 and the second air-suction channel 1222 may be disposed at left and right sides of the drive-belt mounting chamber 123 respectively and spaced apart from each other, such that dirty air and the dust sucked through a dust-suction port of the brushroll casing 12 are transmitted into the first air-suction channel 1221 and the second air-suction channel 1222 respectively, and then converged together to flow into a dirt cup 37. Specifically, the first air-suction channel 1221 and the second air-suction channel 1222 may be defined by parts provided in the brushroll casing 12 or by inner walls of the brushroll casing 12. Of course, the present disclosure is not limited to this. For example, the first air-suction channel 1221 and the second air-suction channel 1222 may be communicated with each other. That is, an interior of the brushroll casing 12 except a space occupied by the drive-belt mounting chamber 123 belongs to the first air-suction channel 1221 and the second air-suction channel 1222, and the dirty air and the dust sucked through the dust-suction port of the brushroll casing 12 are transmitted into the dirt cup 37 via the drive-belt mounting chamber 123.

Figure 11:
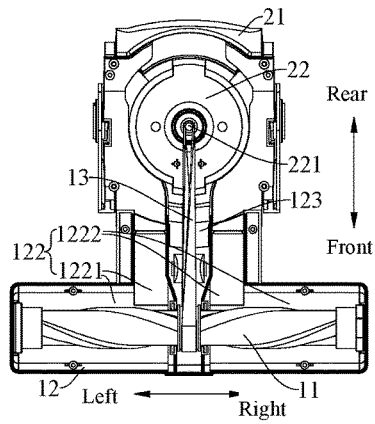
FIG. 11 is a bottom view of the structure illustrated in FIG. 7.
Figure 12:
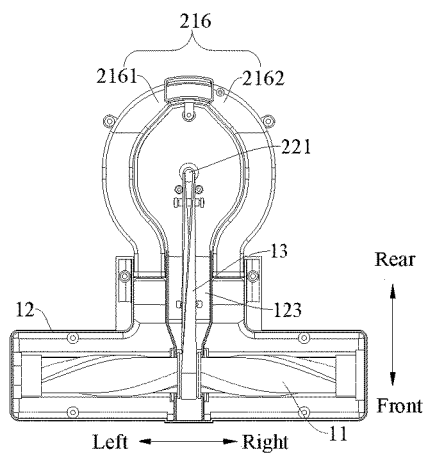
FIG. 12 is a schematic view of an internal channel of the structure illustrated in FIG. 11.
Figure 13:
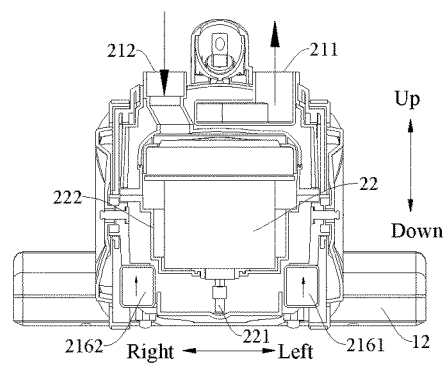
FIG. 13 is a rear view of an internal channel of the structure illustrated in FIG. 8.
Figure 14:
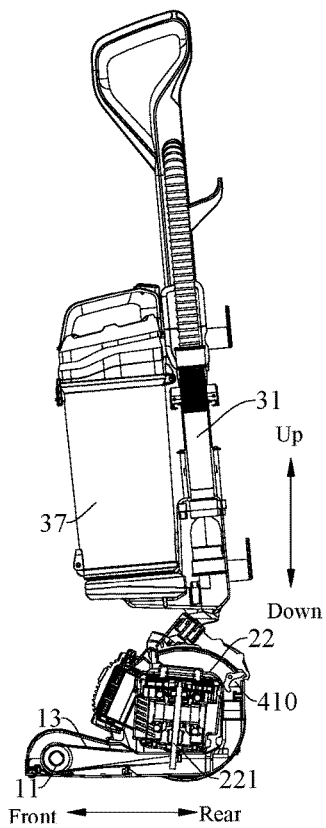
FIG. 14 is a side view of an upright vacuum cleaner according to an embodiment of the present disclosure, in which a motor of the upright vacuum cleaner is located at a first oblique position.
Figure 16:
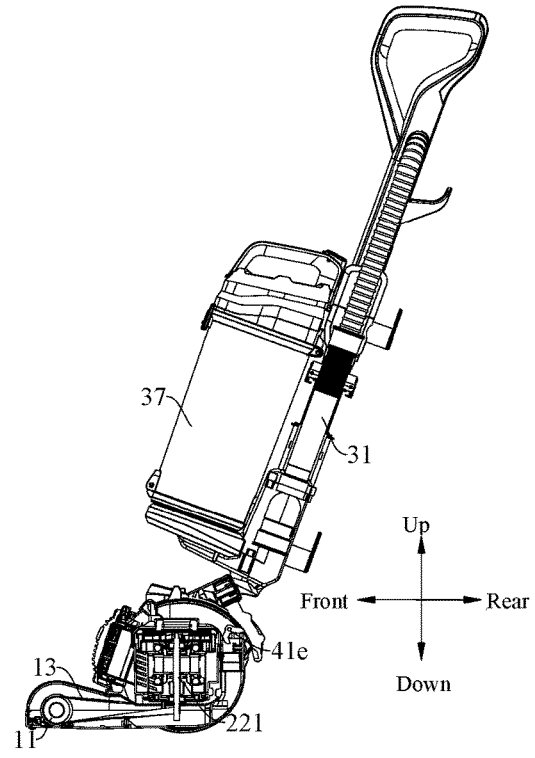
FIG. 16 is a side view of an upright vacuum cleaner according to an embodiment of the present disclosure, in which a motor of the upright vacuum cleaner is located at a first upright position.

As shown in FIG. 11, the first air-suction channel 1221 and the second air-suction channel 1222 both include a lateral air-suction channel section and a longitudinal air-suction channel section. The lateral air-suction channel section extends along the axial direction of the brushroll 11, and the longitudinal air-suction channel section extends along a direction perpendicular to the axial direction of the brushroll 11 and is communicated with the corresponding lateral air-suction channel section.

Specifically, the first air-suction channel 1221 mainly includes the lateral air-suction channel section located at a left side of the connecting-shaft section 113 and the longitudinal air-suction channel section located at a left side of the drive belt 13. The second air-suction channel 1222 mainly includes the lateral air-suction channel section located at a right side of the connecting-shaft section 113 and the longitudinal air-suction channel section located at a right side of the drive belt 13. A central line of each lateral air-suction channel section is perpendicular to a central line of the longitudinal air-suction channel section at a corresponding position.

Optionally, the first air-suction channel 1221 and the second air-suction channel 1222 are respectively formed to have L shapes facing away from each other. The drive-belt mounting chamber 123 is located between the first air-suction channel 1221 and the second air-suction channel 1222. When the brushroll 11 is mounted in the brushroll casing 12, the first brushroll section 111 is rotatably disposed in the first air-suction channel 1221, and the second brushroll section 112 is rotatably disposed in the second air-suction channel 1222. The motor 22 drives the first brushroll section 111 and the second brushroll section 112 to rotate synchronously via the drive belt 13.

Further, the motor housing 21 has a first branch channel 2161 communicated with the first air-suction channel 1221 and a second branch channel 2162 communicated with the second air-suction channel 1222. Specifically, the motor housing 21 is configured to have a hollow column shape and defines the first branch channel 2161 and the second branch channel 2162 therein. The first branch channel 2161 and the second branch channel 2162 are spaced apart from each other. The motor 22 is located between the first branch channel 2161 and the second branch channel 2162. A first end of the first branch channel 2161 is communicated with the first air-suction channel 1221 and a first end of the second branch channel 2162 is communicated with the second air-suction channel 1222. A second end of the first branch channel 2161 and a second end of the second branch channel 2162 are communicated with the dirt cup 37 respectively.

According to an embodiment of the present disclosure, the brushroll casing 12 includes a lower casing 125 and an upper casing 124 connected to a top of the lower casing 125, and the first air-suction channel 1221 and the second air-suction channel 1222 are defined by the upper casing 124 and/or the lower casing 125. Referring to FIG. 2, the brushroll casing 12 mainly includes the upper casing 124 and the lower casing 125, in which a lower end of the upper casing 124 is open, the lower casing 125 is detachably connected with the upper casing 124 to close at least a part of the opening of the upper casing 124, and the upper casing 124 and the lower casing 125 define the dust-suction port therebetween. Further, the first air-suction channel 1221, the drive-belt mounting chamber 123 and the second air-suction channel 1222 are formed between the upper casing 124 and the lower casing 125 and spaced apart from one another along the left-and-right direction. The first air-suction channel 1221 and the second air-suction channel 1222 are not communicated with the drive-belt mounting chamber 123 to prevent debris (such as dust) from being drawn into the drive belt 13, so as to guarantee the reliable operation of the system. The structure of the brushroll casing 12 is simple and compact, and the first air-suction channel 1221, the second air-suction channel 1222 and the drive-belt mounting chamber 123 spaced apart from one another are defined by structures of the upper casing 124 and the lower casing 125, which saves redundant pipes to make it simple to manufacture the brushroll casing 12 with a low cost.

The vertical vacuum cleaner 1 further includes an air-inlet pipe assembly. The air-inlet pipe assembly mainly includes an air inlet pipe 51 and a hose 52. The air inlet pipe 51 is fixed to the motor housing 21. A first end of the air inlet pipe 51 is communicated with a dirty air outlet 211 in the motor housing 21 and a second end of the air inlet pipe 51 is communicated with a first end of the hose 52. A second end of the hose 52 is communicated with a separating chamber 371 of the dirt cup 37. Advantageously, a length of the hose 52 may be greater than that of the body 31 to prolong a separation time and a filtration time of the dirty air and the dust, and also to increase a dust suction capacity, so as to improve the working efficiency of the upright vacuum cleaner 1. Further, a middle part of the hose 52 may be hanged on the body 31 to provide a compact structure. Alternatively, the hose 52 may be a plastic hose 52 or a rubber hose 52, so as to facilitate coiling up the hose 52 to save space and improve the space utilization rate.

The structure and the operation process of the upright vacuum cleaner 1 according to embodiments of the present disclosure will be described with reference to the accompanying drawings.

As shown in FIGS. 1 to 35, the upright vacuum cleaner 1 mainly includes the brush assembly 100, the motor assembly 200, the body assembly 300, the lever drive device 410 and a wheel 38.

Figure 34:
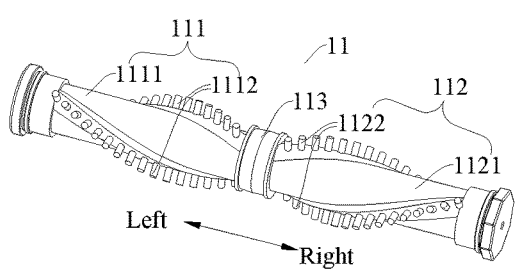
FIG. 34 is a schematic view of a brushroll of an upright vacuum cleaner according to an embodiment of the present disclosure.

The brush assembly 100 mainly includes the brushroll 11 and the brushroll casing 12, and the brushroll casing 12 includes the upper casing 124 and the lower casing 125. The brushroll casing 12 defines the drive-belt mounting chamber 123, and the first air-suction channel 1221 and the second air-suction channel 1222 respectively located at left and right sides of the drive-belt mounting chamber 123. The brushroll 11 is rotatably disposed in the brushroll casing 12, and the drive belt 13 is movably disposed in the drive-belt mounting chamber 123. Further, an end of the drive belt 13 is winded upon a middle part of the brushroll 11. Referring to FIG. 34, the brushroll 11 mainly includes the first brushroll section 111, the second brushroll section 112 and the connecting-shaft section 113 disposed coaxially. The first brushroll section 111 and the second brushroll section 112 are connected with two ends of the connecting-shaft section 113 respectively. The first brushroll section 111 includes a first body 1111 and a first bristle 1112 disposed on the first body 1111, and the second brushroll section 112 includes a second body 1121 and a second bristle 1122 disposed on the second body 1121. The end of the drive belt 13 is winded upon the connecting-shaft section 113 of the brushroll 11. Further, the brushroll casing 12 is also provided with the tensioning wheel 14 to tension the drive belt 13.

Figure 10:
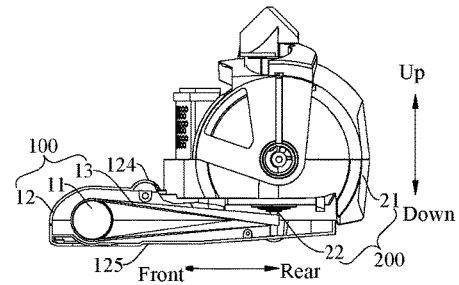
FIG. 10 is a side view of the structure illustrated in FIG. 7.

The motor assembly 200 includes the motor housing 21, the motor 22 and the fan (not shown). The motor housing 21 defines a motor air-suction channel 216 and a motor air-exhaust channel spaced apart from each other. The motor housing 21 has a dirty air outlet 211 communicated with the motor air-suction channel 216, and a clean air inlet 212 communicated with the motor air-exhaust channel. The motor 22 is disposed vertically inside the motor housing 21 and is rotatable with respect to the motor housing 21. That is, the motor shaft 221 of the upright vacuum cleaner 1 is arranged along the vertical direction, the motor 22 is disposed behind the brushroll 11 and the motor shaft 221 of the motor 22 is connected with the brushroll 11 via the drive belt 13. Specifically, the first end of the drive belt 13 is fitted over the motor shaft 221 of the motor 22 while the second end of the drive belt 13 is fitted over the brushroll 11. When the motor shaft 221 of the motor 22 rotates, the motor shaft 221 drives the drive belt 13 to move, and the drive belt 13 drives the brushroll 11 to rotate around its own rotating axis. Thus, the motor 22 drives the brushroll 11 to rotate. Referring to FIG. 10, since an axial direction of the motor shaft 221 of the motor 22 is not parallel with an axial direction of the brushroll 11, the drive belt 13 between the brushroll 11 and the motor shaft 221 is twisted for one time with a twist angle of 30° to 90°. Further, the motor 22 may drive the fan to rotate so as to generate a vacuuming airflow to provide a vacuuming power for the upright vacuum cleaner 1, and the motor 22 may also drive the brushroll 11 to rotate around its own axis so as to realize the purpose of cleaning the floor.

Figure 35:
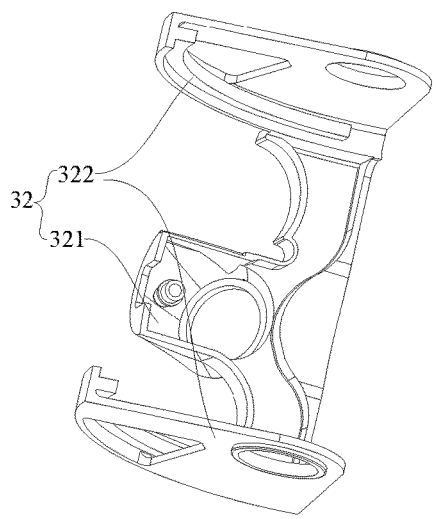
FIG. 35 is a schematic view of a bridging member of an upright vacuum cleaner according to an embodiment of the present disclosure.

The body assembly 300 includes the body 31, the bridging member 32 and the dirt cup 37, in which the dirt cup 37 and the bridging member 32 are mounted to the body 31 respectively. The bridging member 32 is connected with a lower end of the body 31. Referring to FIG. 35, the bridging member 32 mainly includes two side plates 322 and a top plate 321 provided between the two side plates 322. Each side plate 322 of the bridging member 32 is disposed at an outer side of a side wall of the motor housing 21 and rotatably connected with the motor housing 21. Meanwhile, the rotatable wheel 38 is provided at an outer side of each side plate 322 of the bridging member 32, so that it is convenient for the user to push the upright vacuum cleaner 1 when the upright vacuum cleaner 1 operates. The dirt cup 37 defines the separating chamber 371 therein, and includes an air inlet 372 and an air outlet 373 communicated with the separating chamber 371 respectively. The body 31 defines a body air-exhaust channel 311 therein. An air-exhaust pipe 39 is provided between the body 31 and the motor housing 21. Two ends of the air-exhaust pipe 39 are communicated with the body air-exhaust channel 311 of the body 31 and the clean air inlet 212 of the motor housing 21 respectively. The dust and debris sucked through the dust-suction port of the brushroll casing 12 are transmitted into the motor air-suction channel 216 of the motor housing 21 via the first air-suction channel 1221 and the second air-suction channel 1222 respectively, and then flow into the separating chamber 371 of the dirt cup 37 to be filtered. The clean air obtained is discharged to the motor air-exhaust channel of the motor housing 21 from the air outlet 373 of the dirt cup 37, and finally discharged to the outside from an air-exhaust hole 213 of the motor housing 21.

The lever driving device 410 may be a lever rotating member 41e or a lever cam member 41b (41c). The lever driving device 410 is rotatably disposed to the motor housing 21, and is fitted with the bridging member 32 and the motor casing 222 of the motor 22 respectively, such that the bridging member 32 may drive the lever driving device 410 to rotate, and the lever driving device 410 may further drive the motor 22 to rotate.

Referring to FIG. 1, when the upright vacuum cleaner 1 is in the non-working state, the upright vacuum cleaner 1 may be placed upright on the floor, i.e. the body 31 of the upright vacuum cleaner 1 is located at the second upright position, thus occupying a small space. If the user needs to use the upright vacuum cleaner 1, the user may hold a handle of the body 31 by hands to push the upright vacuum cleaner 1 to operate. First, the user may turn on the switch of the upright vacuum cleaner 1, in which case the drive belt 13 is in the loosened state, and the motor 22 cannot drive the brushroll 11 to rotate. That is, the upright vacuum cleaner 1 is in a stand-by state where the brushroll 11 does not sweep dust. Then, the body 31 is rotated from the second upright position to the second oblique position by hands, and in such process, the bridging member 32 on the motor housing 21 rotates clockwise along with the body 31 relative to the motor housing 21, such that the bridging member 32 drives the motor 22 in the motor housing 21 to rotate by driving the lever driving device 410 on the motor housing 21. That is, the motor 22 is rotated from the first oblique position to the first upright position. In this process, the lower end of the motor shaft 221 moves backwards gradually, such that the distance between the lower end of the motor shaft 221 and the brushroll 11 is increased, and thus the drive belt 13 is tensioned. Therefore, the motor 22 may drive the brushroll 11 to rotate by the drive belt 13, so as to start the operations of dust sweep and dust suction. Of course, the present disclosure is not limited to this. The user may rotate the body 31 from the second upright position to the second oblique position directly, in which process the drive belt 13 is tensioned gradually, and then the switch of the upright vacuum cleaner 1 is turned on to implement the operations of dust sweep and dust suction simultaneously.

That is, the user just needs to turn on the switch and then manipulate a direction of the handle of the body 31, so as to start or stop the dust sweep with simple manipulations, instead of manipulations on a control interface. Alternatively, the switch may be provided to the handle of the body 31 to facilitate manipulations by hands, or may be provided to the brushroll casing 12 or the motor housing 21 below the body 31 to make it convenient for the user to turn on the switch by feet. The motor 22 may be disposed near the floor. That is, the gravity center of the motor 22 is lower than that of the motor 22 of the vacuum cleaner in the related art, such that among the upright vacuum cleaners having the body 31 of the same length, the upright vacuum cleaner 1 in the present disclosure is easier to manipulate with less effort.

When the upright vacuum cleaner 1 is in the working state, the dirty air and the dust are introduced into the brushroll air-suction channel 122 via the dust-suction port of the brushroll casing 12, then flow into the motor air-suction channel 216 in the motor housing 21, and further discharged into the body assembly 300 via a dirty air output pipe 214 on the motor housing 21. The clean air obtained by filtration of the body assembly 300 enters the motor air-exhaust channel in the motor housing 21 via a clean air input pipe 215 on the motor housing 21. The air-exhaust pipe 39 is disposed between the body 31 and the motor housing 21, and two ends of the air-exhaust pipe 39 are communicated with the body air-exhaust channel 311 of the body 31 and the clean air inlet 212 of the motor housing 21 respectively. The clean air obtained by filtration of the dirt cup 37 is introduced into the motor air-exhaust channel in the motor housing 21 after sequentially passing through the body air-exhaust channel 311, the air-exhaust pipe 39 and the clean air inlet 212, and finally discharged to the outside from the air-exhaust hole 213 of the motor housing 21.

It shall be noted that when the body 31 is rotated from the second upright position to the second oblique position at the predetermined angle, the motor 22 may rotate synchronously along with the body 31. When the body 31 rotates to the predetermined angle, the body 31 may be manipulated freely by hands without any impact on the tensioned state of the drive belt 13. That is, when the motor 22 rotates from the first oblique position to the first upright position, the body 31 may be manipulated freely by hands without affecting the dust sweep and the dust suction of the upright vacuum cleaner 1. Of course, the present disclosure is not limited to this. The rotation angle of the body 31 may be directly associated with the rotation angle of the motor 22, i.e. the position state of the motor 22 may be adjusted through adjusting the oblique angle of the body 31 by hands so as to adjust the tension degree of the drive belt 13.

The other configurations and manipulations of the upright vacuum cleaner 1 according to embodiments of the present disclosure are known to those skilled in the art, which will not be elaborated herein.

Reference throughout this specification to "an embodiment," "some embodiments," "an example," "specific examples" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples. Those skilled in the art can integrate and combine different embodiments or examples and the features in different embodiments or examples in the specification.

Although embodiments of the present disclosure have been shown and illustrated, it shall be understood by those skilled in the art that various changes, modifications, alternatives and variants without departing from the principle and spirit of the present disclosure are acceptable. The scope of the present disclosure is defined by the claims or the like.

What is claimed is:
1. An upright vacuum cleaner, comprising:
a brushroll;
a motor assembly comprising a motor housing and a motor disposed in the motor housing, wherein the motor is configured to drive the brushroll to roll via a drive belt and is rotatable between a first upright position in which the drive belt is tensioned and a first oblique position in which the drive belt is loosened;
a body assembly comprising a body and a bridging member mounted to the body, wherein the bridging member is rotatably connected with the motor housing to allow the body to be rotatable between a second upright position and a second oblique position; and a lever driving device rotatably disposed to the motor housing and having two ends respectively fitted with the bridging member and the motor, wherein the bridging member is configured to drive the motor to move from the first oblique position to the first upright position via the lever driving device when the body is moved from the second upright position to the second oblique position.

2. The upright vacuum cleaner according to claim 1, wherein the bridging member is provided with a sliding rail, the sliding rail defines a sliding-rail tail groove at a tail end thereof, and the sliding-rail tail groove is formed by recessing a surface of the tail end of the sliding rail, the lever driving device is configured as a lever rotating member rotatably disposed to the motor housing and having two ends fitted with the sliding rail and the motor respectively, wherein when the body is moved from the second upright position to the second oblique position, the body slides a first end of the lever rotating member out from the sliding-rail tail groove to the sliding rail via the bridging member, so as to rotate the lever rotating member, so that a second end of the lever rotating member drives the motor to move from the first oblique position to the first upright position.

3. The upright vacuum cleaner according to claim 2, wherein the sliding rail is configured as an arc sliding rail whose central axis is a rotating axis of the bridging member.

4. The upright vacuum cleaner according to claim 2, wherein the sliding-rail tail groove is smoothly transmitted to and connected with the sliding rail via a guide surface.

5. The upright vacuum cleaner according to claim 2, wherein the sliding rail is provided to an inner top wall of the bridging member.

6. The upright vacuum cleaner according to claim 2, wherein one lever rotating member is provided and opposite to a center of a top of a side of the motor away from the brushroll.

7. The upright vacuum cleaner according to claim 2, wherein the lever rotating member comprises:

a rotational mounting portion rotatably connected to the motor housing;

a first actuating part and a second actuating part respectively fixed to two sides of the rotational mounting portion in a same axial section thereof and extending away from each other, wherein the first actuating part is configured to be fitted with the motor, and the second actuating part is configured to be fitted with the sliding rail.

8. The upright vacuum cleaner according to claim 7, wherein a surface of the second actuating part configured to be fitted with the sliding rail is configured as a first smooth curved surface.

9. The upright vacuum cleaner according to claim 7, wherein a surface of the first actuating part configured to be fitted with the motor is configured as a second smooth curved surface.

10. The upright vacuum cleaner according to claim 1, wherein the lever driving device is configured as a lever cam member, and the lever cam member is rotatably connected to a top wall and/or a side wall of the motor housing, wherein the lever cam member comprises:

a rotational connecting portion rotatably connected to the motor housing;

a first actuating portion and a second actuating portion respectively fixed to two sides of the rotational connecting portion in a same axial section thereof and extending away from each other, wherein the first actuating portion is configured to be fitted with the motor, and the second actuating portion is configured to be fitted with the bridging member;

wherein a maximum distance between the second actuating portion and a center of the rotational connecting portion is greater than a maximum distance between the first actuating portion and the center of the rotational connecting portion;

wherein a width of the first actuating portion is decreased gradually along a direction running away from the rotational connecting portion, and a width of the second actuating portion is decreased gradually along another direction running away from the rotational connecting portion, wherein one of the motor housing and the rotational connecting portion is provided with a rotating shaft, and the other one of the motor housing and the rotational connecting portion has a hole in which the rotating shaft is fitted; and wherein the motor is provided with a first contact block configured to be fitted with the first actuating portion.

11. The upright vacuum cleaner according to claim 10, wherein the lever cam member has a retaining groove, and the first contact block is configured to be fitted in the retaining groove when the motor is located at the first oblique position.

12. The upright vacuum cleaner according to claim 10, wherein the bridging member is provided with a second contact block configured to be fitted with the second actuating portion.

13. The upright vacuum cleaner according to claim 1, wherein the lever driving device is configured as a lever cam member, and two lever cam members are symmetrically provided to two side walls of the motor housing.

14. The upright vacuum cleaner according to claim 1, wherein an elastic member is provided between the motor and the motor housing and is configured to push the motor to move from the first upright position to the first oblique position when the body is moved from the second oblique position to the second upright position, wherein the motor is provided with a first column and the motor housing is provided with a second column, the elastic member is configured as a spring and has two ends fitted over the first column and the second column respectively, so as to constantly apply a push force on the motor towards the first oblique position.

15. The upright vacuum cleaner according to claim 1, wherein the motor is rotated from the first oblique position to the first upright position by an angle of 1° to 10°.

16. The upright vacuum cleaner according to claim 15, wherein the motor is rotated from the first oblique position to the first upright position by an angle of 3° to 8°.

17. The upright vacuum cleaner according to claim 15, wherein the motor is rotated from the first oblique position to the first upright position by an angle of 5°.

18. The upright vacuum cleaner according to claim 1, further comprising a tensioning wheel or another elastic member for adjusting a tension degree of the drive belt.

19. The upright vacuum cleaner according to claim 1, wherein the bridging member and the body are processed and molded separately and connected by assembling, or the bridging member and the body are processed and molded integrally.

20. The upright vacuum cleaner according to claim 1, wherein a motor shaft of the motor is arranged vertically, a rotating axis of the brushroll is perpendicular to the motor shaft, and the drive belt is twisted by an angle of 90° and winded upon the motor shaft and the brushroll respectively, so as to allow the motor to drive the brushroll to roll, wherein the brushroll comprises a first brushroll section provided with bristles, a second brushroll section provided with bristles, and a connecting-shaft section connected between the first brushroll section and the second brushroll section, the drive belt is winded upon the motor shaft and the connecting-shaft section to allow the motor to drive the brushroll to roll;
   wherein respective central axes of the first brushroll section, the second brushroll section and the connecting-shaft section are located in a same line, and the first brushroll section and the second brushroll section are arranged symmetrically with respect to the drive belt; and
   a brushroll casing covering the brushroll, wherein the brushroll casing defines a drive-belt mounting chamber configured to accommodate the connecting-shaft section and the drive belt, a first air-suction channel and a second air-suction channel located at both sides of the drive-belt mounting chamber and separated from the drive-belt mounting chamber.

* * * * *